(12) United States Patent
Yu et al.

(10) Patent No.: US 12,538,440 B2
(45) Date of Patent: Jan. 27, 2026

(54) ELECTRONIC DEVICE, SCREEN BEARING PLATE, AND FLEXIBLE SCREEN ASSEMBLY

(71) Applicant: Huawei Technologies Co., Ltd., Shenzhen (CN)

(72) Inventors: Weidong Yu, Shanghai (CN); Weihua Mao, Shanghai (CN); Bo Wu, Shanghai (CN); Jianqing Sheng, Shanghai (CN); Bo Huang, Shanghai (CN); Xiaotao Dai, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 151 days.

(21) Appl. No.: 18/688,871

(22) PCT Filed: Aug. 24, 2022

(86) PCT No.: PCT/CN2022/114607
§ 371 (c)(1),
(2) Date: Mar. 4, 2024

(87) PCT Pub. No.: WO2023/030140
PCT Pub. Date: Mar. 9, 2023

(65) Prior Publication Data
US 2024/0373566 A1 Nov. 7, 2024

(30) Foreign Application Priority Data
Sep. 3, 2021 (CN) .......................... 202111032646.4

(51) Int. Cl.
H05K 5/02 (2006.01)

(52) U.S. Cl.
CPC ...................................... *H05K 5/02* (2013.01)

(58) Field of Classification Search
CPC ........ G06F 1/16; G06F 1/1641; G06F 1/1652; G06F 1/1681; G06F 1/1616; G06F 1/1637; G06F 1/1656; G06F 1/1624; G06F 1/1643; G06F 1/203; H05K 5/02; H05K 5/03; H04M 1/0268; H04M 1/022;
(Continued)

(56) References Cited

U.S. PATENT DOCUMENTS 11,550,364 B2 * 1/2023 Cavallaro ............. G06F 1/1643
11,653,520 B2 * 5/2023 Sim ..................... H04M 1/0268
361/679.01

(Continued)

FOREIGN PATENT DOCUMENTS

CN 103514812 A 1/2014
CN 110058444 A 7/2019
(Continued)

Primary Examiner — Abhishek M Rathod
(74) Attorney, Agent, or Firm — Conley Rose, P.C.

(57) ABSTRACT

An electronic device includes a foldable screen bearing plate, a flexible display panel, and a support plate. The support plate includes a first support plate, a second support plate, and a third support plate. The screen bearing plate is provided with a reinforcing area, at a location corresponding to a gap between two adjacent support plates, with rigidity higher than that of a surrounding subsection. The reinforcing area is above at least a part of the gap, and overlaps the support plates on two sides of the part of the gap.

14 Claims, 31 Drawing Sheets

(58) Field of Classification Search
CPC ............ H04M 1/0216; H04M 1/0214; H04M 1/02222; H04M 1/0247
See application file for complete search history.

(56) References Cited

U.S. PATENT DOCUMENTS

| | | | |
|---|---|---|---|
| 11,792,946 B2* | 10/2023 | Park | H05K 5/0226 |
| | | | 361/679.01 |
| 2014/0003006 A1 | 1/2014 | Ahn | |
| 2019/0132987 A1* | 5/2019 | Koo | H05K 7/18 |
| 2020/0137907 A1* | 4/2020 | Kang | E05D 3/122 |
| 2021/0263563 A1* | 8/2021 | Tsuchihashi | G06F 1/1652 |
| 2022/0057835 A1 | 2/2022 | Feng et al. | |
| 2023/0354533 A1* | 11/2023 | Fu | H04M 1/0268 |

FOREIGN PATENT DOCUMENTS

| | | |
|---|---|---|
| CN | 110491285 U | 11/2019 |
| CN | 209882285 U | 12/2019 |
| CN | 111862820 A | 10/2020 |
| CN | 112927625 A | 6/2021 |
| CN | 113053238 A | 6/2021 |
| CN | 214042900 U | 8/2021 |
| CN | 113793554 A | 12/2021 |
| EP | 4063996 A1 | 9/2022 |
| WO | WO-2021129407 A1 * 7/2021 ........... G06F 1/1681 |

\* cited by examiner

ELECTRONIC DEVICE, SCREEN BEARING PLATE, AND FLEXIBLE SCREEN ASSEMBLY

This is a U.S. National Stage of International Patent Application No. PCT/CN2022/114607 filed on Aug. 24, 2022, which claims priority to Chinese Patent Application No. 202111032646.4 filed on Sep. 3, 2021, all of which are incorporated by reference.

TECHNICAL FIELD

This application relates to the field of terminals, and in particular, to an electronic device, a screen bearing plate, and a flexible screen assembly.

BACKGROUND

In an inward-folding device, to weaken a crease of a flexible display panel, a flexible screen assembly that is folded up has a specific shape. To form the specific shape in the inward-folding device, a support plate is usually needed to support the flexible screen assembly.

The flexible screen assembly includes a flexible display panel and a screen bearing plate on the back of the flexible display panel. To implement a bend of the specific shape, both the flexible display panel and the screen bearing plate need to have high flexibility. In addition, to ensure flatness of the flexible screen assembly when the inward-folding device is in a flattened state, the screen bearing plate further needs to have specific rigidity.

SUMMARY

To ensure that a flexible screen assembly is bent in a specific shape in a bent state, and to ensure flatness in a flattened state, this application provides a screen bearing plate, an electronic device, and a flexible screen assembly that have good flexibility and rigidity. The electronic device specifically includes a foldable screen bearing plate, a flexible display panel, and a support plate. The support plate includes a first support plate, a second support plate, and a third support plate. When the electronic device is in a flattened state, the screen bearing plate is sandwiched between the flexible display panel and the support plate, and planes on which the screen bearing plate, the flexible display panel, and the support plate are located are parallel to each other. The screen bearing plate is provided with a reinforcing area, at a location corresponding to a gap between two adjacent support plates, with rigidity higher than that of a surrounding subsection. The reinforcing area is above at least a part of the gap, and overlaps the support plates on two sides of the part of the gap. The electronic device implements overall support of the two adjacent support plates for the screen bearing plate, improves support, at the gap, of the support plates for the screen bearing plate, and implements stable support of the screen bearing plate for the flexible display panel. In the electronic device, an impact resistance capability of the flexible display panel at a location corresponding to the gap can be improved, thereby ensuring flatness and stability of the flexible display panel during use of the electronic device, and improving user experience.

According to a first aspect of this application, an electronic device is provided. The electronic device includes a foldable screen bearing plate, a flexible display panel, and a support plate. The support plate includes a first support plate, a second support plate, and a third support plate, and the screen bearing plate is disposed between the flexible display panel and the support plate. When the electronic device is in a flattened state, a direction along which the first support plate, the second support plate, and the third support plate are sequentially disposed is a first direction; the screen bearing plate includes a first section, a second section, a third section, a fourth section, and a fifth section that are sequentially disposed along the first direction, where rigidity of the first section and the fifth section is higher than rigidity of the second section, the third section, and the fourth section; and the third section includes a first subsection, a second subsection, a third subsection, a fourth subsection, and a fifth subsection sequentially disposed along the first direction, where rigidity of the first subsection, the third subsection, and the fifth subsection is lower than rigidity of the second subsection and the fourth subsection. When the electronic device is in a folded state, the first section and the fifth section are disposed opposite each other, the second section, the third section, and the fourth section are in a bent state, the first support plate, the second support plate, and the third support plate are disposed around to form an accommodating space, and at least a part of the screen bearing plate and at least a part of the flexible display panel are disposed in the accommodating space. When the electronic device is in the flattened state, each of orthographic projections, on a plate surface of the screen bearing plate, of the first support plate, the second support plate, and a first gap between the first support plate and the second support plate is at least partially within an area in which the second subsection is located, and each of orthographic projections, on the plate surface of the screen bearing plate, of the second support plate, the third support plate, and a second gap between the second support plate and the third support plate is at least partially within an area in which the fourth subsection is located.

The rigidity refers to a capability of a material or a structure to resist elastic deformation when taking a force. The rigidity represents a difficulty of elastic deformation of a material or a structure. Rigidity of a material is usually measured by a modulus of elasticity. In a macroscopic elasticity range, the rigidity is a proportionality coefficient with a load of a part in direct proportion to displacement, that is, a force needed to cause unit displacement. A higher rigidity indicates a higher capability of a material or a structure to resist elastic deformation, that is, more difficulty for the material or the structure to deform. A lower rigidity indicates a lower capability of a material or a structure to resist elastic deformation, that is, less difficulty for the material or the structure to deform. Rigidity of a section may be understood as an average rigidity of the whole section. Similarly, rigidity of a subsection may be understood as an average rigidity of the whole subsection. The rigidity is related to quality, a substantive volume, and a specific structure and shape of a material or a structure. The plate surface of the screen bearing plate is a surface, of the screen bearing plate, parallel to an illumination surface of the flexible display screen. When the electronic device is in the flattened state, the plate surface of the screen bearing plate is the surface, of the screen bearing plate, parallel to the illumination surface of the flexible display screen, and the surface is a plane. It can be understood that a plane in this application is a plane with flatness within a specific range, and is not necessarily an absolutely flat surface.

To be specific, in an implementation of this application, when the electronic device is in the flattened state, the orthographic projection, of the first support plate, on the plate surface of the screen bearing plate overlaps at least a part of the area in which the second subsection is located, that is, the orthographic projection, of the first support plate, on the plate surface of the screen bearing plate overlaps at least partially the area in which the second subsection is located. The orthographic projection, of the second support plate, on the plate surface of the screen bearing plate overlaps at least a part of the area in which the second subsection is located, that is, the orthographic projection, of the second support plate, on the plate surface of the screen bearing plate overlaps at least partially the area in which the second subsection is located. The orthographic projection, of the first gap, on the plate surface of the screen bearing plate overlaps at least a part of the area in which the second subsection is located, that is, the orthographic projection, of the first gap, on the plate surface of the screen bearing plate overlaps at least partially the area in which the second subsection is located. Similarly, the second support plate, the third support plate, and the second gap between the second support plate and the third support plate have a similar relative location relationship with the fourth subsection.

In other words, when the electronic device is in the flattened state, a part of the second subsection overlaps the first support plate, another part of the second subsection overlaps the second support plate, and still another part of the second subsection covers the first gap between the first support plate and the second support plate. Similarly, a part of the fourth subsection overlaps the second support plate, another part of the fourth subsection overlaps the third support plate, and still another part of the fourth subsection covers the second gap between the second support plate and the third support plate.

In addition, a part of the second subsection overlaps at least a local area of the first support plate, another part of the second subsection overlaps at least a local area of the second support plate, and still another part of the second subsection covers at least a local area of the first gap between the first support plate and the second support plate. Similarly, a part of the fourth subsection overlaps at least a local area of the second support plate, another part of the fourth subsection overlaps at least a local area of the third support plate, and still another part of the fourth subsection covers at least a local area of the second gap between the second support plate and the third support plate.

In a possible implementation of this application, when the second subsection includes two or more sub-subsections separated from each other, the foregoing descriptions of the second subsection are descriptions of each of the sub-subsections. Similarly, when the fourth subsection includes two or more sub-subsections separated from each other, the foregoing descriptions of the fourth subsection are descriptions of each of the sub-subsections.

The screen bearing plate is provided with the subsection, with relatively high rigidity, at the gap between every two adjacent support plates, and the subsection with relatively high rigidity is used to correspond to and support the flexible display panel above the gap between every two adjacent support plates. Specifically, for example, two sides of the subsection with relatively high rigidity overlap or partially overlap two adjacent support plates, so that the screen bearing plate supports the flexible display panel entirely and stably. In this way, strength of the screen bearing plate for supporting the flexible display panel at the gap is improved, that is, impact resistance of the flexible display panel is improved. Further, the flexible display panel can be prevented from bending or deformation in the flattened state, and defects such as a failure of impact on, and a black spot on the flexible display panel at a location corresponding to the gap between the flexible display panel and the support plate can be avoided. Based on this, the screen bearing plate can improve user experience and prolong service life of the electronic device.

In a possible implementation, the screen bearing plate and the flexible display panel bond with and are fixed to each other through an adhesive layer. The adhesive layer between the screen bearing plate and the flexible display panel may be a continuous adhesive layer over an entire surface, or may be an adhesive layer with intermittent dots, or may be an adhesive layer with a hollowed-out area.

In a possible implementation of the first aspect, rigidity of the second section and the fourth section is higher than rigidity of the third section, and the rigidity of the first subsection, the third subsection, and the fifth subsection is lower than the rigidity of the second section and the fourth section. It can be understood that the rigidity of the second subsection and the fourth subsection and the rigidity of the second section and the fourth section are not specifically limited, provided that it is ensured to comprehensively consider that the rigidity of the third section including the first subsection, the second subsection, the third subsection, the fourth subsection, and the fifth subsection is lower than the rigidity of the second section and the fourth section.

In the foregoing electronic device, the rigidity of the second section and the fourth section is higher than the rigidity of the third section, so that when the electronic device is in the folded state, one end, of the accommodating space, closer to the first section and the fifth section has a smaller dimension, and the other end closer to the third section has a larger dimension. The rigidity of the first subsection, the third subsection, and the fifth subsection is lower than the rigidity of the second section and the fourth section. As the rigidity of the first subsection, the third subsection, and the fifth subsection is lower than the rigidity of the second section and the fourth section, an average rigidity of the third section can be lower than the rigidity of the second section and the fourth section when the rigidity of the second section and the fourth section is relatively large.

In a possible implementation of the first aspect, when the electronic device is in the flattened state, the orthographic projection, of the first gap, on the plate surface of the screen bearing plate, is within the area in which the second subsection is located, and the orthographic projection, of the second gap, on the plate surface of the screen bearing plate, is within the area in which the fourth subsection is located.

To be specific, in an implementation of this application, the second subsection of the screen bearing plate can completely cover the first gap between the first support plate and the second support plate, and the fourth subsection of the screen bearing plate can completely cover the second gap between the second support plate and the third support plate.

In the foregoing electronic device, on one hand, the second subsection fully covers the first gap, and the fourth subsection fully covers the second gap. On the other hand, the second subsection and the fourth subsection are subsections that penetrate the screen bearing plate, so that balance in bendability performance of the screen bearing plate in a bending direction is improved.

In a possible implementation of the first aspect, when the electronic device is in the flattened state, an orthographic projection, on the plate surface of the screen bearing plate, of a part that is of the first gap and that extends along a direction perpendicular to the first direction is within the area in which the second subsection is located, and an orthographic projection, on the plate surface of the screen bearing plate, of a part that is of the second gap and that extends along a direction perpendicular to the first direction is within the area in which the fourth subsection is located.

In a possible implementation of the first aspect, when the electronic device is in the flattened state, the second subsection and the fourth subsection are rectangular areas, and the rectangular areas penetrate the screen bearing plate along the direction perpendicular to the first direction.

That is, in an implementation of this application, the second subsection and the fourth subsection are rectangular areas that penetrate the screen bearing plate along the direction perpendicular to the first direction. In the foregoing electronic device, the second subsection and/or the fourth subsection are/is disposed as several subsections that penetrate the screen bearing plate along a second direction, to ensure consistency of a structure of the screen bearing plate at a same location along the first direction and further facilitate dispersion, along the second direction, of stress generated in the folded state to two ends of the screen bearing plate, thereby avoiding residual stress as much as possible. Therefore, in the foregoing implementation, consistency of bendability performance of the screen bearing plate is ensured, and a local protrusion formed on the screen bearing plate along the second direction in the folded state is avoided, thereby further prolonging service life of the screen bearing plate and the flexible display panel.

In a possible implementation of the first aspect, dimensions of the second subsection and the fourth subsection in the first direction range from 0.5 mm to 2 mm.

That is, in an implementation of this application, a dimension of the second subsection in a length direction of a mobile phone ranges from 0.5 mm to 2 mm. The second subsection within the dimension range can stably support the first support plate and the second support plate on two sides of the first gap when bendability of the third section is ensured. Similarly, a dimension of the fourth subsection in the length direction of the mobile phone ranges from 0.5 mm to 2 mm. The fourth subsection within the dimension range can stably support the second support plate and the third support plate on two sides of the second gap when bendability of the third section is ensured.

In a possible implementation of the first aspect, the first subsection, the second subsection, the third subsection, the fourth subsection, and the fifth subsection are made of a same material, and a thickness of at least a part of each of the second subsection and the fourth subsection is less than a thickness of the first subsection, the third subsection, and the fifth subsection.

That is, in an implementation of this application, when the first subsection, the second subsection, the third subsection, the fourth subsection, and the fifth subsection that are of the third section are made of the same material, thicknesses of the second subsection and the fourth subsection are reduced, and the rigidity of the second subsection and the fourth subsection is appropriately reduced by reducing the thicknesses of the second subsection and the fourth subsection, thereby improving bendability of the second subsection and the fourth subsection. It can be understood that the rigidity of the second subsection and the fourth subsection with reduced thicknesses is still higher than the rigidity of the first subsection, the third subsection, and the fifth subsection.

In addition, to avoid a feeling of a void between the screen bearing plate and the flexible display panel, a thickness of a side, of each of the second subsection and the fourth subsection, closer to the support plate is reduced.

In the foregoing electronic device, the bendability of the second subsection and the fourth subsection is appropriately improved by reducing the thicknesses of the second subsection and the fourth subsection. That is, not only support stability of the second subsection and the fourth subsection is ensured, but the bendability of the second subsection and the fourth subsection is also improved.

In a possible implementation of the first aspect, a groove is provided in both the second subsection and the fourth subsection. The groove extends along the second direction, and when the electronic device is in the flattened state, the second direction is parallel to the plate surface of the screen bearing plate, where the second direction is perpendicular to the first direction.

When a material of the screen bearing plate is at least one of titanium alloy, aluminum alloy, and stainless steel, the foregoing electronic device may provide the groove in the second subsection and the fourth subsection by etching.

That is, in an implementation of this application, the groove is provided in both the second subsection and the fourth subsection along the second direction, where the second direction is parallel to the plate surface of the screen bearing plate, in the flattened state, of the electronic device, and is perpendicular to the first direction. It can be understood that the groove is provided in at least a part of the second subsection and at least a part of the fourth subsection that are of the same screen bearing plate, and no groove is provided on another part. For example, thicknesses of two sides, of the second subsection, closer to the first support plate and the second support plate along the first direction remain the same, and the groove is provided in a middle area between the two sides. Alternatively, the groove is provided in all parts of the second subsection and all parts of the fourth subsection that are on the same screen bearing plate. A thickness of a bottom of the groove in the second subsection is the thickness of at least the part of the second subsection, and a thickness of the bottom of the groove in the fourth subsection is the thickness of at least the part of the fourth subsection. In the foregoing electronic device, a groove extending along the second direction are provided in both the second subsection and the fourth subsection, and a structure is simple and is relatively not difficult for molding.

In a possible implementation of the first aspect, an opening of the groove faces away from the illumination surface of the flexible display panel.

In the foregoing electronic device, the opening of the groove faces the support plate, and the bottom of the groove faces the flexible display panel, so that a feeling of a void is avoided as much as possible when a user touches the flexible display panel, thereby improving user experience.

In a possible implementation of the first aspect, the groove includes a first groove and a second groove. A reinforcing rib is disposed between the first groove and the second groove, and the reinforcing rib extends along the second direction. The electronic device can further improve the rigidity and strength of the second subsection and the fourth subsection.

It can be understood that when an overall dimension of the groove along the first direction is relatively large, for example, when the dimension of the groove along the first direction is greater than 1.5 mm, the groove includes the first groove and the second groove, and the reinforcing rib is disposed between the first groove and the second groove.

In a possible implementation of the first aspect, a dimension of the groove in the second subsection and the fourth subsection in a thickness direction of the electronic device ranges from 0.03 mm to 0.15 mm.

That is, in an implementation of this application, the dimension of the groove in the second subsection in the thickness direction of the electronic device ranges from 0.5 mm to 2 mm. The second subsection within the dimension range can stably support the first support plate and the second support plate on the two sides of the first gap when bendability of the third section is ensured. Similarly, the dimension of the groove in the fourth subsection in the thickness direction of the electronic device ranges from 0.5 mm to 2 mm. The fourth subsection within the dimension range can stably support the second support plate and the third support plate on the two sides of the second gap when bendability of the third section is ensured.

In a possible implementation of the first aspect, the first subsection, the second subsection, the third subsection, the fourth subsection, and the fifth subsection are made of the same material, and a plurality of hole structures are provided in the second subsection and the fourth subsection. It can be understood that the hole structures may be through holes or blind holes.

In an implementation, a maximum one-dimensional dimension, of each of the hole structures, on the plate surface of the screen bearing plate is less than a minimum one-dimensional dimension of a minimum contact zone. The minimum contact zone may be a touch zone that is obtained based on big data and that represents a minimum area for a user to touch or a minimum unidirectional dimension for touch, for example, may be a minimum zone in which the user uses a finger to touch a screen.

In a possible implementation of the first aspect, a cross-sectional shape, of each of the hole structures, parallel to the plate surface of the screen bearing plate is any one of a circle, a rectangle, a racetrack, and a dumbbell.

In an implementation, the groove, the reinforcing rib, and hole structures in each of the second subsection and the fourth subsection may be randomly matched based on a requirement on bending and a requirement on support. To be specific, the second subsection and the fourth subsection may each be provided with the groove, the second subsection and the fourth subsection may each be provided with the hole structures in the groove, the second subsection and the fourth subsection may each be directly provided with the hole structures, the second subsection and the fourth subsection may each be provided with the reinforcing rib in the groove, or one of the subsections is divided into a plurality of sub-subsections, where any one of the foregoing forms may be used in the plurality of sub-subsections.

In another implementation, the groove, the reinforcing rib, and the hole structures in each of the second subsection and the fourth subsection may be matched based on a width of a gap between two adjacent support plates. For example, a wider gap between the two adjacent support plates indicates a less deep groove, a more densely laid-out reinforcing rib indicates a smaller diameter of each of the hole structures and a smaller coverage proportion of the hole structures.

In some other implementations, the groove, the reinforcing rib, and the hole structures in each of the second subsection and the fourth subsection are matched based on a contour shape of a gap between two adjacent support plates.

In a possible implementation of the first aspect, a material of the screen bearing plate is at least one of titanium alloy, aluminum alloy, and stainless steel.

In an implementation, a process for processing the screen bearing plate is etching. For example, a second bending groove, a groove, a reinforcing rib, hole structures, a long-strip-shaped through hole, and a third bending groove that are on the screen bearing plate are etched through an etching process.

In a possible implementation of the first aspect, long-strip-shaped through holes are provided in the first subsection, the third subsection, and the fifth subsection, and each of the long-strip-shaped through holes extends along the direction perpendicular to the first direction, and the plurality of long-strip-shaped through holes are staggered and adjacent to each other along the first direction, and a first bending groove is provided on a first surface of the second subsection, where the first surface of the second section faces away from the illumination surface of the flexible display panel, and the third bending groove is provided on a first surface of the fourth section, where the first surface of the fourth section faces away from the illumination surface of the flexible display panel.

In a possible implementation of the first aspect, the electronic device further includes a first midframe, a second midframe, and a bendable mechanism. The first section is fixedly connected to the first midframe, the fifth section is fixedly connected to the second midframe, and the first midframe and the second midframe are fixedly connected to the bendable mechanism separately; the first support plate is rotatably connected to the bendable mechanism and is capable of sliding relative to the bendable mechanism, and the second support plate is rotatably connected to the bendable mechanism and is capable of sliding relative to the bendable mechanism; when the electronic device is in the flattened state, a maximum distance between the second support plate and a housing of the bendable mechanism is a first distance, and when the electronic device is in the folded state, a maximum distance between the second support plate and the housing of the bendable mechanism is a second distance, where the first distance is greater than the second distance; and when the electronic device is in the flattened state, an upper surface of the first support plate, an upper surface of the second support plate, an upper surface of the third support plate, an upper surface of the first midframe, and an upper surface of the second midframe are on a same plane. The maximum distance between the second support plate and the housing of the bendable mechanism is a maximum distance, in the thickness direction of the electronic device, between any point on the second support plate and any point on the housing.

In the foregoing electronic device, the first support plate, the second support plate, and the third support plate can move to form the accommodating space for accommodating the flexible display panel. A dimension of an area, of the accommodating space, adjacent to the second support plate is larger, and a dimension of an area away from the second support plate is smaller. In this way, after the bendable mechanism is folded, a crease on the flexible display panel correspondingly disposed over the bendable mechanism is not obvious, so that damage to the flexible display panel in a process of bending can be avoided. In an unfolding process of the bendable mechanism, an end, of the first support plate, away from the second support plate moves in a direction away from an axle seat, and an end, of the third support plate, away from the second support plate moves in a direction away from the axle seat. When the electronic device is completely in the flattened state, a support surface of the first support plate and a support surface of the second support plate are flush with a support surface of the third support plate, so that the screen bearing plate and the flexible display panel are in the flattened state. Based on this, when a user performs a touch operation, the first support plate, the second support plate, and the third support plate can provide strong support for flatness of the flexible display panel, thereby improving user operation experience and viewing experience.

In a possible implementation of the first aspect, when the electronic device is in the folded state, at least a part of the second section, at least a part of the third section, and at least a part of the fourth section are disposed in the accommodating space.

In a possible implementation of the first aspect, the screen bearing plate further includes a sixth section disposed between the second section and the third section, and a seventh section disposed between the third section and the fourth section. The first support plate is connected to at least a part of the sixth section, and the third support plate is connected to at least a part of the seventh section. When the electronic device is in the folded state, each of the second section, the third section, and the fourth section are bent, and the second section, the sixth section, the third section, the seventh section, and the fourth section jointly form a specific shape.

In a possible implementation, the sixth section of the screen bearing plate may be fixedly connected to, for example, may bond with and be fixed to, through an adhesive layer, a part of the support surface of the first support plate. The seventh section may be fixedly connected to, for example, may bond with and be fixed to, through an adhesive layer, a part of the support surface of the third support plate.

It can be understood that an adhesive layer between the first section and the first midframe, the adhesive layer between the sixth section and the first support plate, the adhesive layer between the seventh section and the third support plate, and an adhesive layer between the fifth section and the second midframe may each be a continuous adhesive layer over an entire surface, may each be an adhesive layer with intermittent dots, or may each be an adhesive layer with a hollowed-out area.

A second aspect of this application provides a foldable screen bearing plate. The screen bearing plate may be applied to an electronic device including a flexible display panel and a support plate. The screen bearing plate includes a first section, a second section, a third section, a fourth section, and a fifth section that are sequentially disposed along a third direction. The third section includes a first subsection, a second subsection, a third subsection, a fourth subsection, and a fifth subsection sequentially disposed along the third direction, where rigidity of the first subsection, the third subsection, and the fifth subsection is lower than rigidity of the second subsection and the fourth subsection.

In a possible implementation of the second aspect, the rigidity of the first subsection, the third subsection, and the fifth subsection is lower than the rigidity of the second subsection and the fourth subsection.

In a possible implementation of the second aspect, when the electronic device is in a flattened state, an orthographic projection, of a first gap, on a plate surface of the screen bearing plate is within an area in which the second subsection is located, and an orthographic projection, of a second gap, on the plate surface of the screen bearing plate is within an area in which the fourth subsection is located.

In a possible implementation of the second aspect, dimensions of the second subsection and the fourth subsection in the third direction range from 0.5 mm to 2 mm.

In a possible implementation of the second aspect, when the electronic device is in the flattened state, the second subsection and the fourth subsection are rectangular areas, and the rectangular areas penetrate the screen bearing plate along the direction perpendicular to the third direction.

In a possible implementation of the second aspect, the first subsection, the second subsection, the third subsection, the fourth subsection, and the fifth subsection are made of a same material, and a thickness of at least a part of each of the second subsection and the fourth subsection is less than thicknesses of the first subsection, the third subsection, and the second subsection.

In a possible implementation of the second aspect, a groove is provided in both the second subsection and the fourth subsection. The groove extends along a direction perpendicular to the third direction.

In a possible implementation of the second aspect, an opening of the groove faces away from an illumination surface of the flexible display panel.

In a possible implementation of the second aspect, the groove includes a first groove and a second groove. A reinforcing rib is disposed between the first groove and the second groove, and the reinforcing rib extends along the direction perpendicular to the third direction.

In a possible implementation of the second aspect, a dimension of at least a part of each of the second subsection and the fourth subsection in a thickness direction of the electronic device ranges from 0.03 mm to 0.15 mm.

In a possible implementation of the second aspect, the first subsection, the second subsection, the third subsection, the fourth subsection, and the fifth subsection are made of the same material, and a plurality of hole structures are provided in the second subsection and the fourth subsection.

In a possible implementation of the second aspect, a cross-sectional shape, of each of the hole structures, parallel to the plate surface of the screen bearing plate is any one of a circle, a rectangle, a racetrack, and a dumbbell.

A third aspect of this application provides a flexible screen assembly, including any screen bearing plate and any flexible display panel according to the second aspect. The screen bearing plate is disposed on a surface, of the flexible display panel, closer to a support plate, and is connected to the flexible display panel.

Figure 1A:
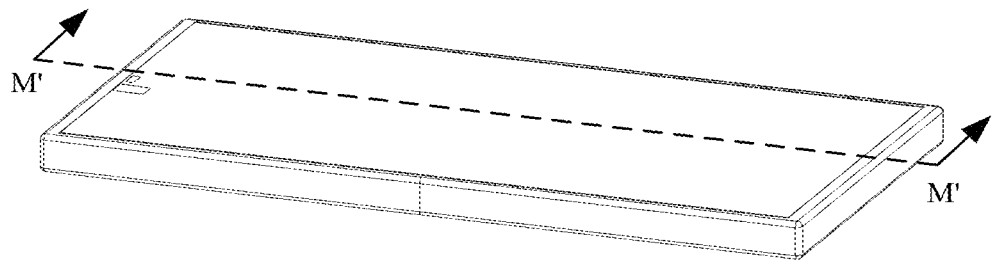
FIG. 1(a) is a three-dimensional diagram of an electronic device 1' in a flattened state according to some embodiments.

Descriptions of reference signs in the accompanying drawings are provided. $S_1$: first direction; $S_2$: second direction; $S_3$: thickness direction; 1': electronic device; 2': flexible screen assembly; 10': screen bearing plate; 10m': front side of the screen bearing plate; 10n': back side of the screen bearing plate; 100': first section; 200': second section; 290': long-strip-shaped through hole; 300': third section; 400': fourth section; 500': fifth section; 20': flexible display panel; 3': support apparatus; 30': support plate; 31': first support plate; 32': second support plate; 33': third support plate; 40': first midframe; 50': second midframe; 60': bendable mechanism; 1: electronic device; 2: flexible screen assembly; 10: screen bearing plate; 10m: front side of the screen bearing plate; 10n: back side of the screen bearing plate; 100: first section; 200: second section; 210: second bending groove; 220: void; 300: third section; 310: first subsection; 320: second subsection; 330: third subsection; 340: fourth subsection; 350: fifth subsection; 360: groove; 370: reinforcing rib; 380: hole structure; 390: long-strip-shaped through hole; 400: fourth section; 410: third bending groove; 500: fifth section; 600: sixth section; 700: seventh subsection; 20: flexible display panel; 20m: front side of the flexible display panel; 20n: back side of the flexible display panel; 30: support plate; 31: first support plate; 32: second support plate; 33: third support plate; Gap 1: first gap; Gap 2: second gap; $g_1$: projection; $g_{11}$: first segment of projection; $g_{12}$: second segment of projection; $g_{13}$: third segment of projection; $g_2$: projection; $g_{21}$: first segment of projection; $g_{22}$: second segment of projection; $g_{23}$: third segment of projection; 40: first midframe; 50: second midframe; 60: bendable mechanism; 61: axle seat; 62: first bracket; 63: second bracket; 64: synchronization apparatus; 65: first synchronization arm; 66: second synchronization arm; 67: sliding block; and 68: housing.

DESCRIPTION OF EMBODIMENTS

To make the objectives, technical solutions, and advantages of this application clearer, implementations of this application are further described below in detail with reference to the accompanying drawings.

This application provides an electronic device. The electronic device may be a foldable electronic product, for example, a mobile phone, a tablet computer, a laptop computer, or a wearable device. When a screen bearing plate in the electronic device is in a folded state, one end of an accommodating space formed by support plates is of a smaller dimension, and the other end is of a larger dimension, there are three support plates. An example in which the electronic device is a mobile phone and a shape of the screen bearing plate in the electronic device in the folded state is the shape described above is used for description. In addition, a state in which the screen bearing plate, a flexible screen assembly, and the electronic device are folded is referred to as a folded state, and a state in which the screen bearing plate, the flexible screen assembly, and the electronic device are flattened is referred to as a flattened state.

Figure 1B:
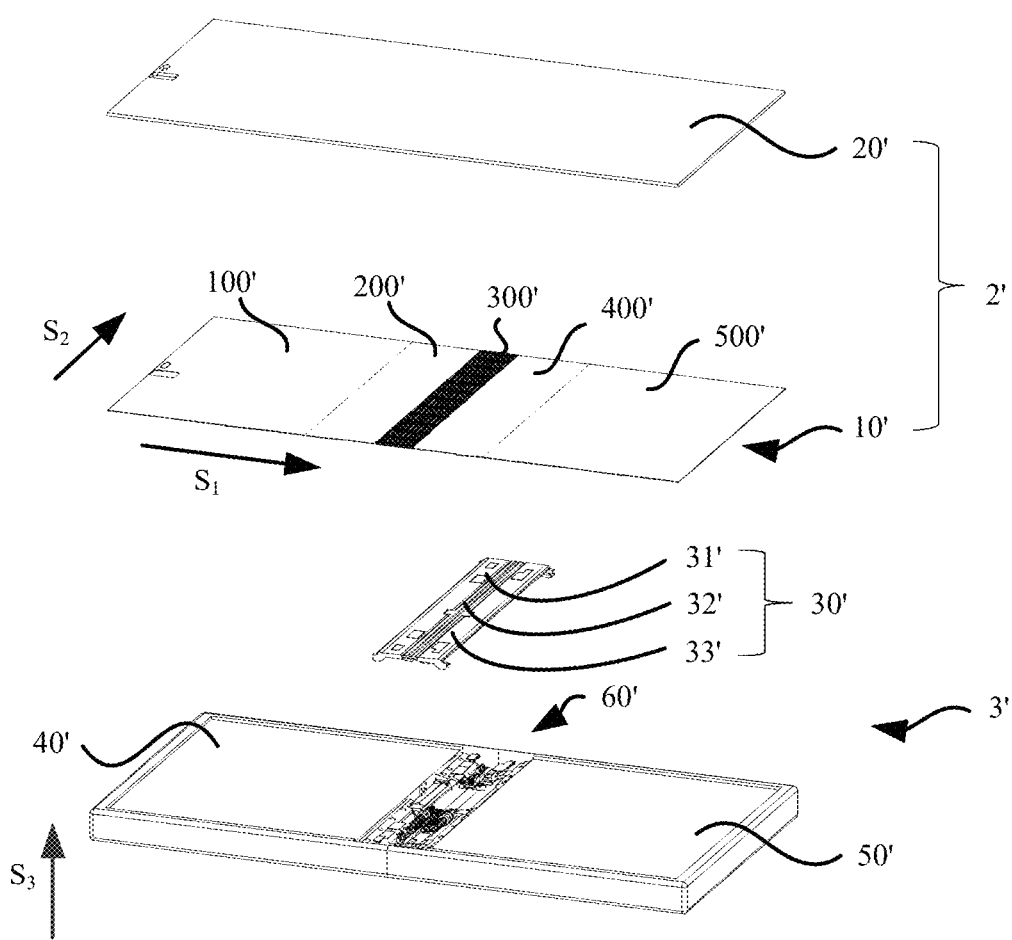
FIG. 1(b) is an exploded diagram of an electronic device 1' in a flattened state according to some embodiments.
Figure 1C:
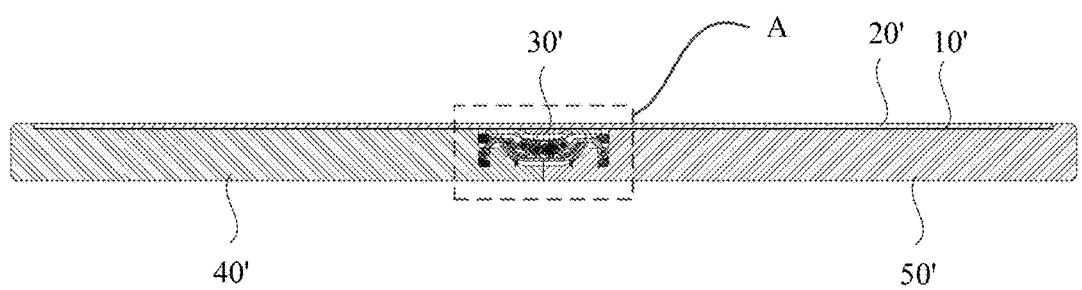
FIG. 1(c) shows a cross-sectional view of an electronic device 1' in a flattened state along M'-M' in FIG. 1(a) according to some embodiments.
Figure 1D:
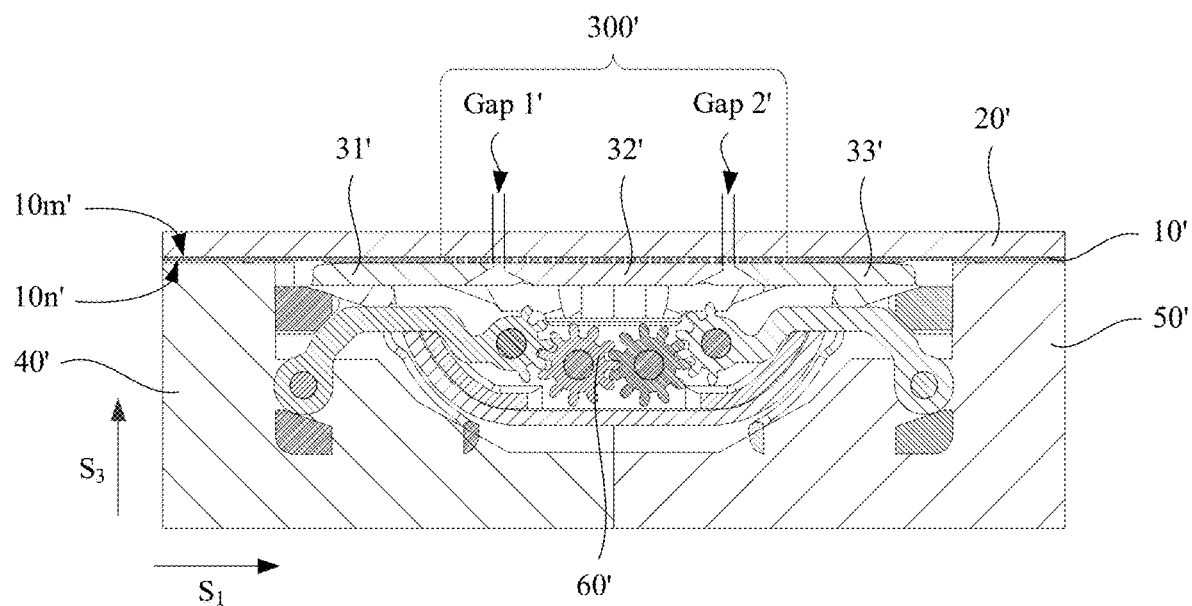
FIG. 1(d) shows a partial enlarged view of an area A in FIG. 1(c)
Figure 1E:
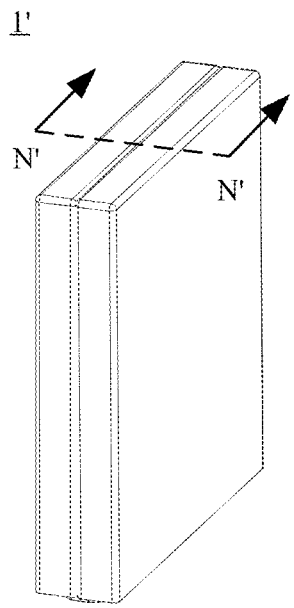
FIG. 1(e) shows a three-dimensional diagram of an electronic device in a folded state according to some embodiments.
Figure 1F:
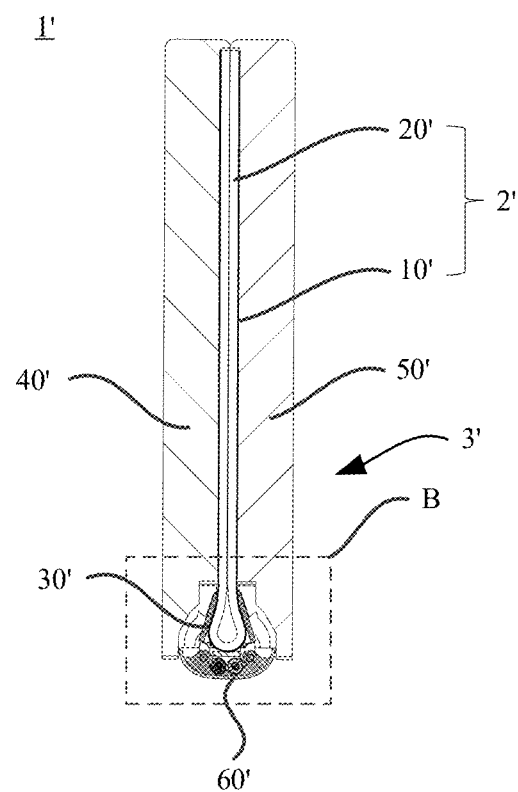
FIG. 1(f) shows a cross-sectional view of an electronic device 1' along N'-N' in FIG. 1(e) according to some embodiments.
Figure 1G:
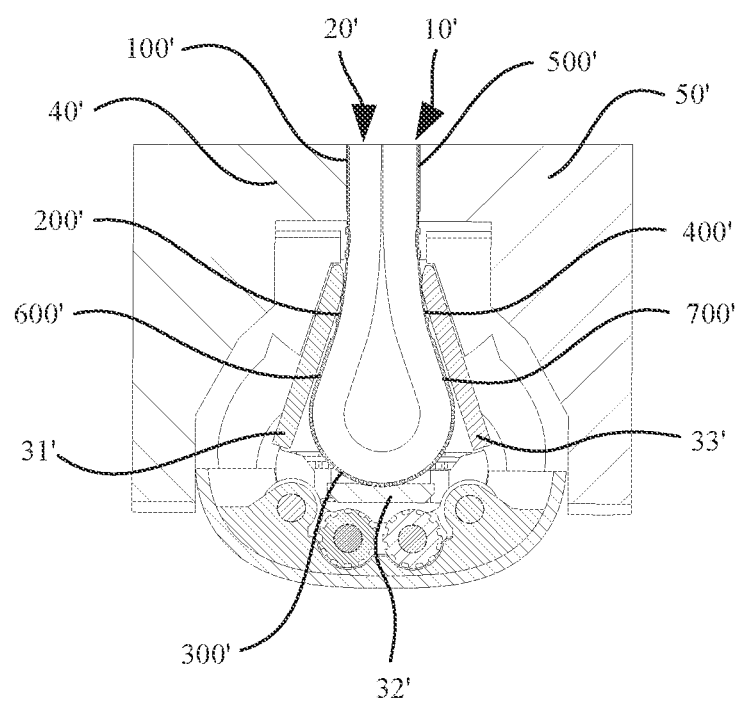
FIG. 1(g) shows a partial enlarged view of an area B in FIG. 1(f)

FIG. 1(a) is a three-dimensional diagram of an electronic device 1' in a flattened state according to some embodiments. FIG. 1(b) is an exploded diagram of the electronic device 1' in the flattened state according to some embodiments. FIG. 1(c) shows a cross-sectional view of the electronic device 1' in the flattened state along M'-M' in FIG. 1(a) according to some embodiments. FIG. 1(d) shows a partial enlarged view of an area A in FIG. 1(c). FIG. 1(e) shows a three-dimensional diagram of the electronic device 1' in a folded state according to some embodiments. FIG. 1(f) shows a cross-sectional view of the electronic device 1' in the folded state along N'-N' in FIG. 1(e) according to some embodiments. FIG. 1(g) shows a partial enlarged view of an area B in FIG. 1(f).

For ease of description, a first direction $S_1$, a second direction $S_2$, a thickness direction $S_3$, a front side, and a back side of a screen bearing plate 10' are defined herein. It can be understood that, in the flattened state, the first direction $S_1$ is a direction in which a first support plate 31', a second support plate 32', and a third support plate 33' are disposed in parallel. It can be learned from FIG. 1(a) that, the first direction $S_1$ is parallel to a plate surface of the screen bearing plate 10', the second direction $S_2$ is parallel to the plate surface of the screen bearing plate 10', and the first direction $S_1$ intersects with the second direction $S_2$. Generally, the first direction S1 and the second direction $S_2$ are perpendicular to each other. The thickness direction $S_3$ is a direction from a bottom surface of the electronic device 1' to a top surface of the electronic device 1' after the electronic device 1' is assembled and is placed as usual. For a flexible display panel 20', a front side of the flexible display panel is an illumination surface of the flexible display panel 20', and a back side of the flexible display panel is a surface opposite to the front side of the flexible display panel. For the screen bearing plate 10', a front side of the screen bearing plate is a surface closer to the back side of the flexible display panel, and a back side of the screen bearing plate is a surface opposite to the front side of the screen bearing plate.

As shown in FIG. 1(b), the electronic device 1' is a foldable device. The electronic device 1' includes a flexible screen assembly 2' and a support apparatus 3'. The flexible screen assembly 2' includes the screen bearing plate 10' and the flexible display panel 20'. The screen bearing plate 10' is disposed on the back side of the flexible display panel. The screen bearing plate 10' includes a first section 100', a second section 200', a third section 300', a fourth section 400', and a fifth section 500' that are sequentially distributed along the first direction $S_1$. The support apparatus 3' includes a support plate 30', a first midframe 40', a second midframe 50', and a bendable mechanism 60'. The support plate 30' includes a first support plate 31', a second support plate 32', and a third support plate 33'. When the electronic device 1' is in the flattened state, the first support plate 31', the second support plate 32', and the third support plate 33' are sequentially disposed along the first direction $S_1$.

As shown in FIG. 1(d), when the electronic device 1' is in the flattened state, the bendable mechanism 60' is located between the first midframe 40' and the second midframe 50', and is fixedly connected to the first midframe 40' and the second midframe 50' separately. The first support plate 31, the second support plate 32', and the third support plate 33' are disposed on the bendable mechanism 60', and an upper surface of the first support plate 31', an upper surface of the second support plate 32', an upper surface of the third support plate 33', an upper surface of the first midframe 40', and an upper surface of the second midframe 50' are on a same plane. The upper surface of the first support plate 31', the upper surface of the second support plate 32', the upper surface of the third support plate 33', the upper surface of the first midframe 40', and the upper surface of the second midframe 50' are all surfaces closer to the screen bearing plate 10'. It can be understood that, the plurality of surfaces being on the same plane means that the plurality of surfaces are approximately parallel to each other, and the plurality of surfaces are basically on the same plane. That is, there may be an included angle within a specific range between the plurality of surfaces. When the plurality of surfaces are parallel surfaces, there may be a distance within a specific range between the plurality of surfaces.

The first support plate 31' is connected to the first midframe 40', the second support plate 32' is connected to the bendable mechanism 60', and the third support plate 33' is connected to the second midframe 50'. The back side of the screen bearing plate 10' is separately connected to the first midframe 40', the second midframe 50', the first support plate 31' and the third support plate 33'. The first support plate 31' is configured to support the second section 200', the second support plate 32' is configured to support the third section 300', the third support plate 33' is configured to support the fourth section 400'. The screen bearing plate 10' is configured to support the flexible display panel 20'. Based on this, the first midframe 40', the second midframe 50', and the bendable mechanism 60' can drive the screen bearing plate 10' and the flexible display panel 20' to fold or unfold.

With reference to FIG. 1(f) and FIG. 1(g), it can be learned that, when the bendable mechanism 60' is deformed, the screen bearing plate 10', the flexible display panel 20', the first midframe 40', and the second midframe 50' are in a folded state. Specifically, the second section 200', the third section 300', and the fourth section 400' of the screen bearing plate 10' are bent around an axis parallel to the second direction $S_2$. The screen bearing plate 10' is on an outer side of the flexible display panel 20', to support the flexible display panel 20'. The first support plate 31', the second support plate 32', and the third support plate 33' are distributed in a triangle with three sides apart from each other and form an accommodating space (not marked out). At least a part of the screen bearing plate 10' is disposed in the accommodating space. The first midframe 40' is on an outer side of the first support plate 31', the bendable mechanism 60' is on an outer side of the second support plate 32', and the second midframe 50' is on an outer side of the third support plate 33'.

Figure 2A:
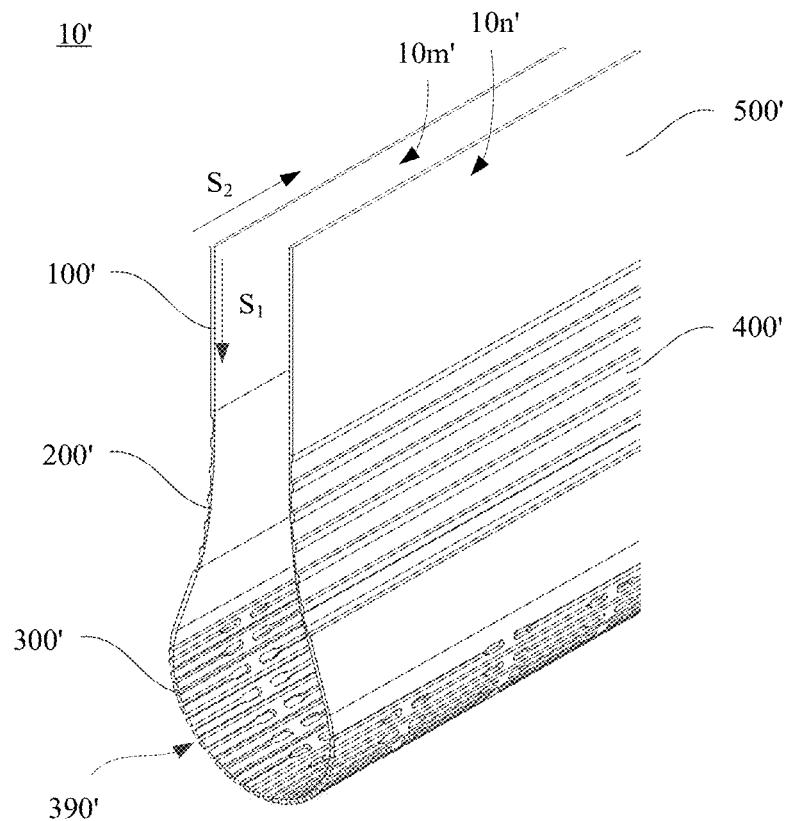
FIG. 2(a) is a three-dimensional diagram of a screen bearing plate 10' in a folded state according to some embodiments.

FIG. 2(a) is a three-dimensional diagram of a screen bearing plate 10' in a folded state according to some embodiments. As shown in FIG. 2(a), in a folded structure of a flexible display panel 20', a radius of curvature of a third section 300' is relatively small. In other words, the third section 300' has high bendability. The screen bearing plate 10' includes a front side 10m' of the screen bearing plate and a back side 10n' of the screen bearing plate on two sides. To improve the bendability of the third section 300', long-strip-shaped through holes 390' extending along a second direction $S_2$ are provided in the third section 300'. The long-strip-shaped through holes 390 connect the front side 10m' of the screen bearing plate and the back side 10n' of the screen bearing plate. For the screen bearing plate 10', rigidity of the screen bearing plate 10' is reduced in a first direction $S_1$ by using the long-strip-shaped through holes 390', and bendability of the screen bearing plate 10' along the first direction $S_1$ is improved, to achieve a folding function of an electronic device 1'.

Figure 2B:
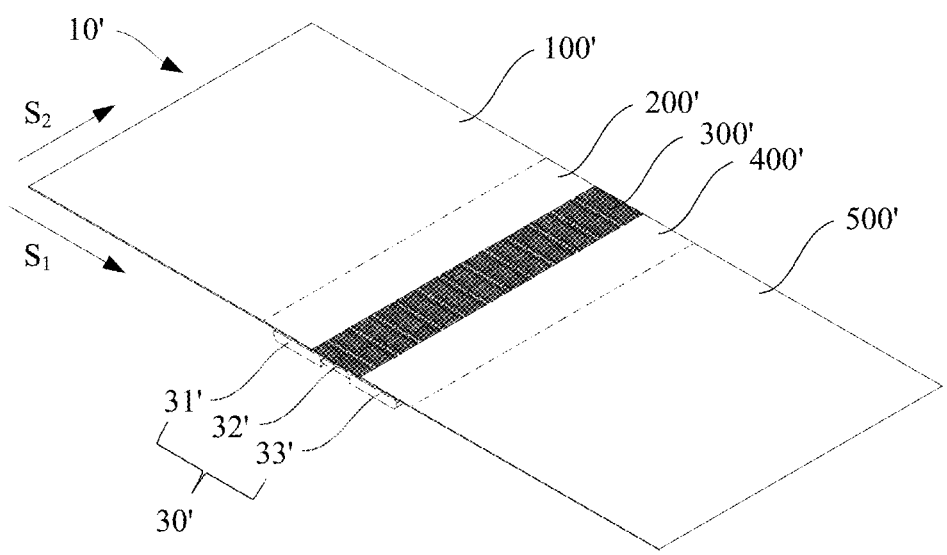
FIG. 2(b) is a three-dimensional diagram of a screen bearing plate 10' and a support plate 30' in a flattened state according to some embodiments.

FIG. 2(b) is a three-dimensional diagram of the screen bearing plate 10' and a support plate' 30 in a flattened state according to some embodiments. With reference to FIG. 1(a), FIG. 1(d), and FIG. 2(b), in the flattened state, the first support plate 31', the second support plate 32', and the third support plate 33' are sequentially distributed in parallel below the second section 200', the third section 300', and the fourth section 400', and both the first gap Gap 1' between the first support plate 31' and the second support plate 32' and the second gap Gap 2' between the second support plate 32' and the third support plate 33' are below the third section 300'. On one hand, the first support plate 31', the second support plate 32', and the third support plate 33' are individual components separated from each other in the second direction $S_2$, and as a result, support provided by the support plate 30' for the flexible display panel 20' is not highly effective at a gap. On the other hand, there are the long-strip-shaped through holes 390' extending in the second direction $S_2$ in the third section 300', and as a result, support provided by the screen bearing plate 10' for the flexible display panel 20' is not highly effective at the gap. Based on this, neither the support plate 30' nor the screen bearing plate 10' can effectively support the flexible display panel 20' above a gap between two adjacent support plates 30'. When a user touches the flexible display panel 20' above the gap, the flexible display panel 20' may easily bend and be deformed. This may cause defects of the flexible display panel 20', for example, failure, impact, and a black spot, affecting user experience and shortening service life of the electronic device 1'.

To resolve the foregoing problem, this application further provides a screen bearing plate, applied between a flexible display panel and a support plate. The screen bearing plate includes a first section, a second section, a third section, a fourth section, and a fifth section that are sequentially disposed along a first direction. The third section includes a first subsection, a second subsection, a third subsection, a fourth subsection, and a fifth subsection. A first support plate, a second support plate, and a third support plate are also sequentially disposed along the first direction. Rigidity of the second section, the third section, and the fourth section is lower than rigidity of the first section and the fifth section, and rigidity of the first section, the third section, and the fifth section is lower than rigidity of the second section and the fourth section. In a folded state, the second section, the third section, and the fourth section are bent around an axis parallel to a second direction. After the screen bearing plate is flattened, the first subsection corresponds to the first support plate, the second subsection corresponds to a gap between the first support plate and the second support plate, the third subsection corresponds to the second support plate, the fourth subsection corresponds to a gap between the second support plate and the third support plate, and the fifth subsection corresponds to the third support plate. The correspondence means that the subsection is disposed above the gap, and in a flattened state, the subsection overlaps support plates on two sides of the gap, so that the support plates on the two sides of the gap support the whole third section continuously by supporting the subsection. It can be understood that rigidity of a section may be understood as an average rigidity of the whole section. Similarly, rigidity of a subsection may be understood as an average rigidity of the whole subsection.

The rigidity refers to a capability of a material or a structure to resist elastic deformation when taking a force. The rigidity represents a difficulty of elastic deformation of a material or a structure. The rigidity of a material is usually measured by a modulus of elasticity E. In a macroscopic elasticity range, the rigidity is a proportionality coefficient with a load of a part in direct proportion to displacement, that is, a force needed to cause unit displacement. A higher rigidity indicates a higher capability of a material or a structure to resist elastic deformation, that is, more difficulty for the material or the structure to deform. A lower rigidity indicates a lower capability of a material or a structure to resist elastic deformation, that is, less difficulty for the material or the structure to deform. It can be understood that the rigidity may be related to quality, a substantive volume, and a specific structure and shape of a material or a structure. In addition, the rigidity may be related to a process of molding a material or a structure and a thermal treatment process. The plate surface of the screen bearing plate is a surface, of the screen bearing plate, parallel to an illumination surface of the flexible display screen. When the electronic device is in the flattened state, the plate surface of the screen bearing plate is the surface, of the screen bearing plate, parallel to the illumination surface of the flexible display screen, and the surface is a plane. It can be understood that a plane in this application is a plane with flatness within a specific range, and is not necessarily an absolutely flat surface.

In an implementation, the rigidity may be represented by a volume actually occupied by a material or a structure per unit volume. For example, a larger volume actually occupied by the material or the structure per unit volume, that is, fewer hollowed-out parts of the material or the structure per unit volume, indicates higher rigidity of the material or the structure, or in other words, lower bendability of the structure. On the contrary, a smaller volume actually occupied by the material or the structure per unit volume, that is, more hollowed-out parts of the material or the structure per unit volume, indicates lower rigidity of the material or the structure, or in other words, higher bendability of the structure. Average rigidity of the structure is a volume actually occupied by the material or the structure per unit volume in terms of the whole structure. The volume actually occupied by the material or the structure per unit volume may be adjusted by disposing a thickness reducing structure, a hollowed-out structure, or a porous structure on the material or the structure. It can be understood that the porous structure may be a porous structure that is disposed on a surface of the material or the structure and that is connected to the outside, or may be a porous structure that is disposed inside the structure and that is isolated from the outside.

In another implementation, the rigidity may alternatively be represented by a material. For example, a material with higher toughness has lower rigidity, and a material with lower toughness has higher rigidity.

It can be understood that the two cases are merely two examples of rigidity, and are merely two forms in which structural rigidity can be distinguished. Any technical solution that can distinguish bendability or rigidity between two structures falls within the protection scope of this application. This is not specifically limited in this application.

The screen bearing plate is provided with the subsection, with relatively high rigidity, at the gap between every two adjacent support plates, and the subsection with relatively high rigidity is used to correspond to and support the flexible display panel above the gap between every two adjacent support plates. Specifically, for example, two sides of the subsection with relatively high rigidity overlap or partially overlap two adjacent support plates, so that the screen bearing plate supports the flexible display panel entirely and stably. In this way, strength of the screen bearing plate for supporting the flexible display panel at the gap is improved, that is, impact resistance of the flexible display panel is improved. Further, the flexible display panel can be prevented from bending or deformation in the flattened state, and defects such as a failure of, impact on, and a black spot on the flexible display panel at a location corresponding to the gap between the flexible display panel and the support plate can be avoided. Based on this, the screen bearing plate can improve user experience and prolong service life of the electronic device.

Specific structures of the screen bearing plate, the flexible screen assembly, and the electronic device in this application are further described in detail with reference to the accompanying drawings by using an example in which an end, of an accommodating space, closer to a first section 100 and a fifth section 500 has a smaller dimension, and an end, of the accommodating space, closer to a third section 300 has a larger dimension when the screen bearing plate in the electronic device is in the folded state.

Figure 3A:
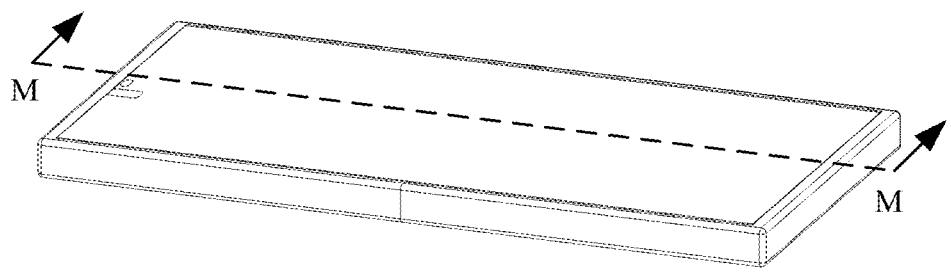
FIG. 3(a) is a three-dimensional diagram of an electronic device 1 in a flattened state according to some embodiments of this application.
Figure 3B:
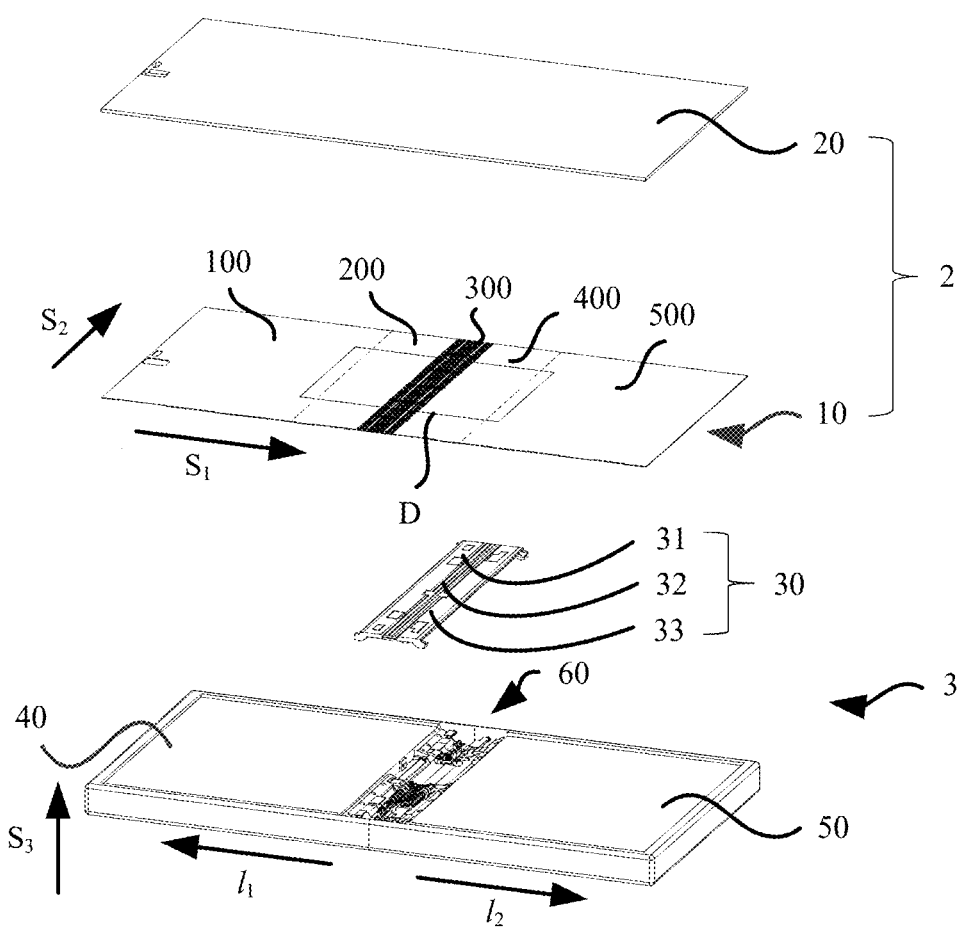
FIG. 3(b) is an exploded diagram of an electronic device 1 in a flattened state according to some embodiments of this application.

FIG. 3(a) is a three-dimensional diagram of an electronic device 1 in a flattened state according to some embodiments of this application. FIG. 3(b) is an exploded diagram of the electronic device 1 in the flattened state according to some embodiments of this application. As shown in FIG. 3(b), this application provides the electronic device 1, including a flexible screen assembly 2 and a support apparatus 3. The support apparatus 3 is configured to support the flexible screen assembly 2, and can be folded or unfolded synchronously with the flexible screen assembly 2.

The flexible screen assembly 2 includes a screen bearing plate 10 and a flexible display panel 20, and the screen bearing plate 10 is disposed on a back side of the flexible display panel 20. The screen bearing plate 10 includes a first section 100, a second section 200, a third section 300, a fourth section 400, and a fifth section 500 that are sequentially disposed along a first direction $S_1$.

The support apparatus 3 includes a support plate 30, a first midframe 40, a second midframe 50, and a bendable mechanism 60. When the electronic device 1 is in the flattened state, the first midframe 40, the second midframe 50, and the bendable mechanism 60 are sequentially arranged along the first direction $S_1$, the support plate 30 is disposed on an upper surface of the bendable mechanism 60, and an upper surface of the support plate 30 is flush with an upper surface of the first midframe 40 and an upper surface of the second midframe 50, that is, the upper surface of the support plate 30, the upper surface of the first midframe 40, and the upper surface of the second midframe 50 are on a same plane. It can be understood that, the plurality of surfaces being on the same plane means that the plurality of surfaces are approximately parallel to each other, and the plurality of surfaces are basically on the same plane. That is, there may be an included angle within a specific range between the plurality of surfaces. When the plurality of surfaces are parallel surfaces, there may be a distance within a specific range between the plurality of surfaces.

The screen bearing plate 10 in the flexible screen assembly 2 is disposed on the upper surfaces of the first midframe 40, the support plate 30, and the second midframe 50. The screen bearing plate 10 is located between the flexible display panel 20 and the support plate 30.

Specifically, the bendable mechanism 60 is located between the first midframe 40 and the second midframe 50, and is fixedly connected to the first midframe 40 and the second midframe 50 separately. The support plate 30 includes a first support plate 31, a second support plate 32, and a third support plate 33 that are sequentially disposed along the first direction $S_1$. The first support plate 31 is flexibly connected to the first midframe 40, the second support plate 32 is in a sliding connection to the bendable mechanism 60, and the third support plate 33 is flexibly connected to the second midframe 50. A manner of connecting the first support plate 31, the second support plate 32, and the third support plate 33 to the bendable mechanism 60 is described subsequently in detail with reference to FIG. 5(a) and FIG. 6(a). Details are not described herein. A back side 10n of the screen bearing plate 10 is fixedly connected to the first midframe 40, the second midframe 50, the first support plate 31, and the third support plate 33 separately. The first support plate 31 is configured to support the second section 200, the second support plate 32 is configured to support the third section 300, the third support plate 33 is configured to support the fourth section 400, and the screen bearing plate 10 is configured to support the flexible display panel 20.

It can be understood that, when the electronic device 1 is in the flattened state, the screen bearing plate 10, the flexible display panel 20, the first midframe 40, the second midframe 50, and the bendable mechanism 60 are in the flattened state. The flattened state means that an included angle between extension directions of two sides of the electronic devices 1 is approximately 180°. For example, the first midframe 40, the bendable mechanism 60, and the second midframe 50 that are in the flattened state are approximately on a same plane. In other words, an included angle between an extension direction $l_1$ of the first midframe 40 and an extension direction 12 of the second midframe 50 is approximately 180°. The included angle between the first midframe 40 and the second midframe 50 being approximately 180° means that the included angle between $l_1$ and $l_2$ may be deviated from 180°. For example, the included angle between $l_1$ and $l_2$ may be 179°, 180°, 181°, or the like.

Figure 3C:
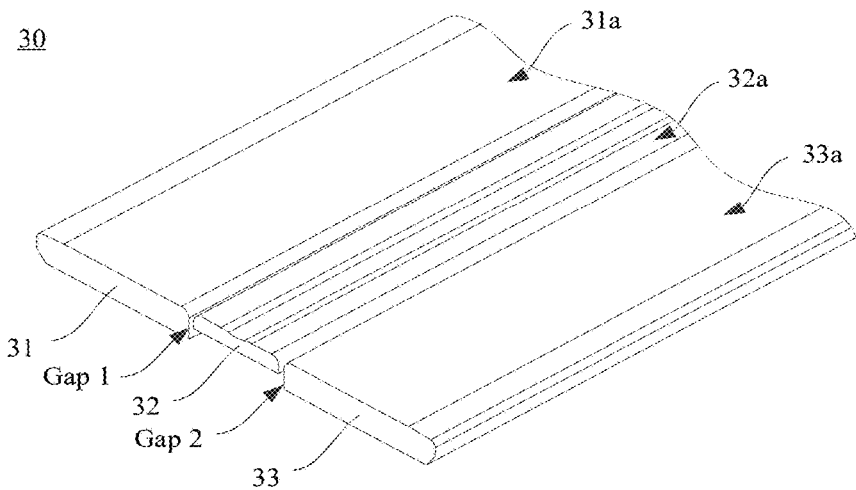
FIG. 3(c) is a three-dimensional diagram of a support plate 30 according to some embodiments of this application.
Figure 3D:
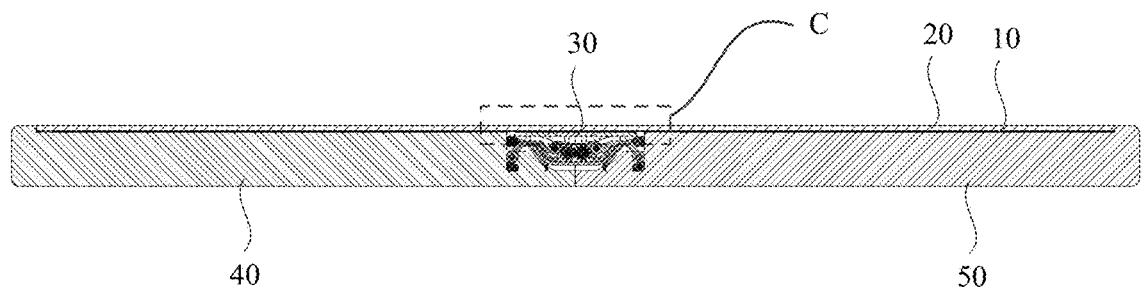
FIG. 3(d) shows a cross-sectional view of an electronic device 1 along M-M in FIG. 3(a) according to some embodiments of this application.
Figure 3E:
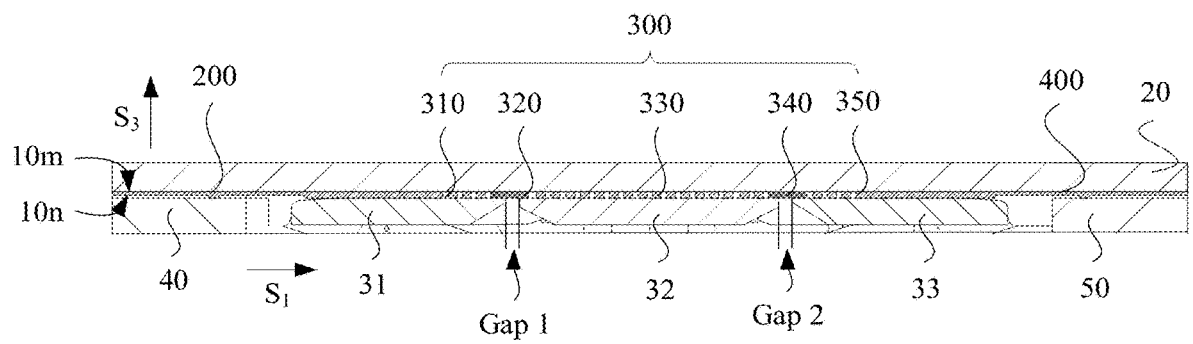
FIG. 3(e) shows a partial enlarged view of an area C in FIG. 3(d)

FIG. 3(c) is a three-dimensional diagram of the support plate 30 according to some embodiments of this application. FIG. 3(d) shows a cross-sectional view of the electronic device 1 in the flattened state along M-M in FIG. 3(a) according to some embodiments of this application. FIG. 3(e) shows a partial enlarged view of an area C in FIG. 3(d). With reference to FIG. 3(c) and FIG. 3(e), it can be learned that the first support plate 31 has a support surface 31a, the second support plate 32 has a support surface 32a, and the third support plate 33 has a support surface 33a. When the electronic device 1 is in the flattened state, the support surface 31a, the support surface 32a, the support surface 33a, the upper surface of the first midframe 40, and the upper surface of the second midframe 50 are on a same plane. The plurality of surfaces being on the same plane has a same meaning as the plurality of surfaces being on the same plane described above. Details are not described herein again. As shown in FIG. 3(e), a first gap between the first support plate 31 and the second support plate 32 is denoted as Gap 1, and a second gap between the second support plate 32 and the third support plate 33 is denoted as Gap 2.

As shown in FIG. 3(e), the third section 300 includes a first subsection 310, a second subsection 320, a third subsection 330, a fourth subsection 340, and a fifth subsection 350 that are sequentially disposed along the first direction $S_1$. The first subsection 310 corresponds to the first support plate 31, the third subsection 330 corresponds to the second support plate 32, and the fifth subsection 350 corresponds to the third support plate 33. The second subsection 320 corresponds to the first gap Gap 1, and the second subsection 340 corresponds to the second gap Gap 2.

The correspondence between the subsection and the support plate means that the subsection is disposed above the support plate, and in the flattened state, the subsection is in contact with the support plate, so that the support plate supports the subsection. For example, the first subsection 310 is disposed above the first support plate 31, and in the flattened state, the first subsection 310 is in contact with the first support plate 31, so that the first support plate 31 can support the first subsection 310. The third subsection 330 is disposed above the second support plate 32, and in the flattened state, the third subsection 330 is in contact with the second support plate 32, so that the second support plate 32 can support the third subsection 330. The fifth subsection 350 is disposed above the third support plate 33, and in the flattened state, the fifth subsection 350 is in contact with the third support plate 33, so that the third support plate 33 can support the fifth subsection 350.

The correspondence between a subsection and a gap between two adjacent support plates means that the subsection is disposed above the gap, and in the flattened state, the subsection overlaps the support plates on two sides of the gap, so that the support plates on the two sides of the gap support the whole third section 300 continuously by supporting the subsection. That the subsection overlaps the support plates on the two sides of the gap may be that at least a part of edges on two sides of the subsection overlaps the support plates on the sides of the gap. For example, the second subsection 320 is disposed above the first gap Gap 1 between the first support plate 31 and the second support plate 32, and it is assumed that the first support plate 31 is on a left side of the second support plate 32, a left edge of the second subsection 320 completely overlaps the first support plate 31, and a right edge of the second subsection 320 completely overlaps the second support plate 32. For another example, the fourth subsection 340 is disposed above the second gap Gap 2 between the second support plate 32 and the second support plate 34, and it is assumed that the second support plate 32 is on a left side of the third support plate 33, at least a part of a left edge of the second subsection 340 overlaps the second support plate 32, and at least a part of a right edge of the fourth subsection 340 overlaps the third support plate 33. In addition, two edges of a same subsection may overlap the support plate in any combination of two manners of overlapping the support plate at least partially or overlapping the support plate completely.

With reference to FIG. 3(b) and FIG. 3(e), it can be learned that, the screen bearing plate 10 is above the first support plate 31, the second support plate 32, the third support plate 33, the first midframe 40, and the second midframe 50, and the support surface 31a of the first support plate 31, the support surface 32a of the second support plate 32, and the support surface 33a of the third support plate 33 are opposite to the back side 10n of the screen bearing plate 10. For example, the second section 200 is above the first support plate 31 and the first midframe 40, the third section 300 is above the first support plate 31, the second support plate 32, and the third support plate 33, and the fourth section 400 is above the third support plate 33 and the second midframe 50. It can be understood that, a component being above another component may be understood as that a back side of the component is opposite to a front side of the another component. For example, the flexible display panel 20 is above the screen bearing plate 10, and a back side 20n of the flexible display panel 20 is opposite to the front side 10m of the screen bearing plate 10.

Figure 4A:
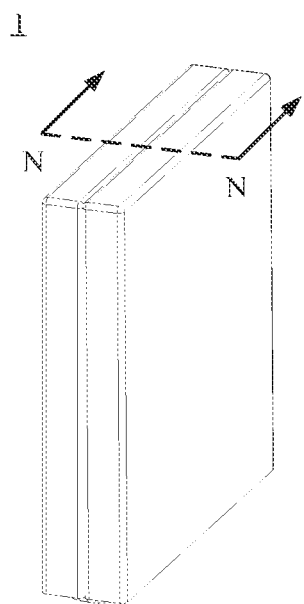
FIG. 4(a) is a three-dimensional diagram of an electronic device 1 in a folded state according to some embodiments of this application.
Figure 4B:
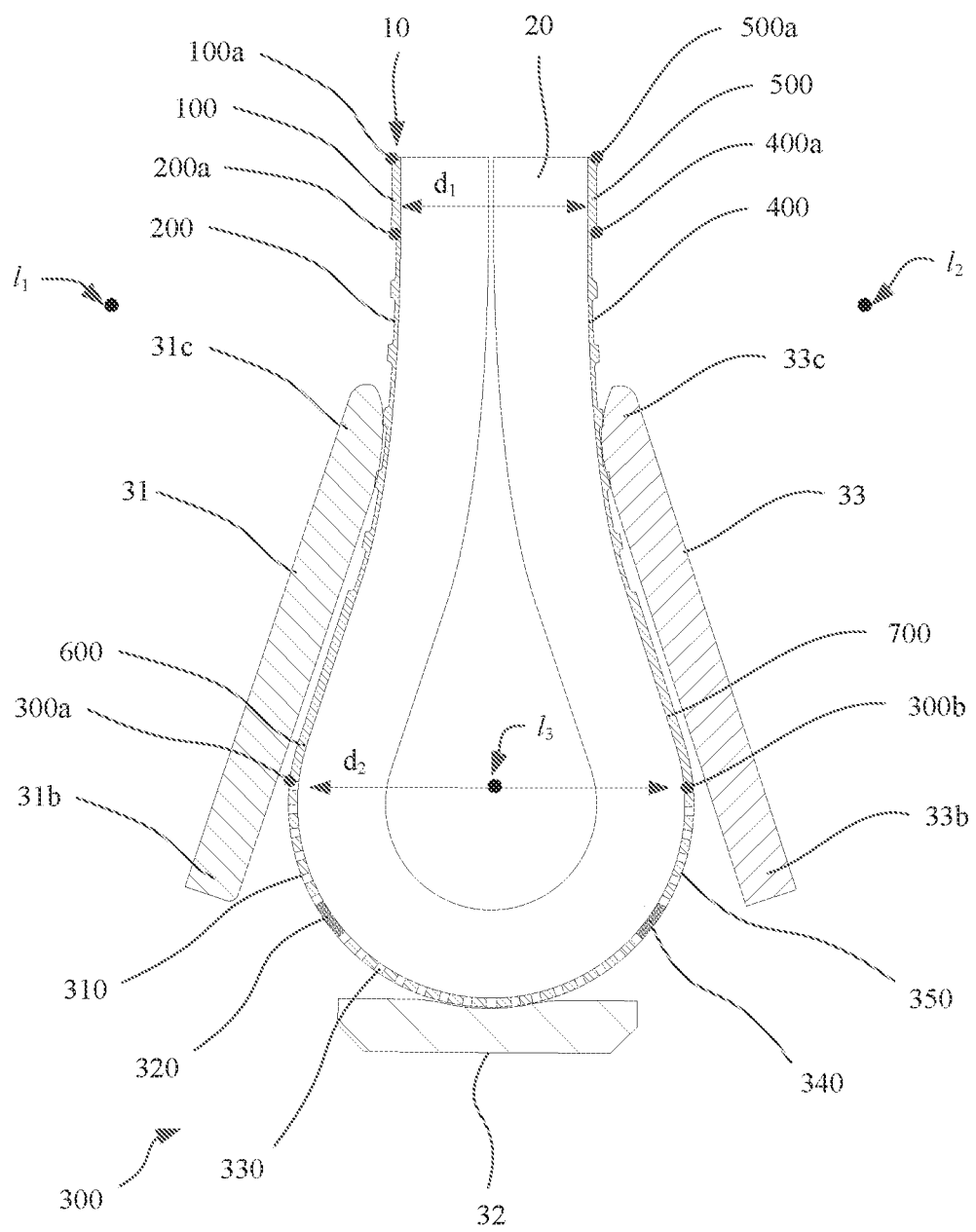
FIG. 4(b) shows a cross-sectional view of the screen bearing plate 10, the flexible display panel 20, and the support plate 30 in FIG. 4(a) along N-N in FIG. 4(a)

FIG. 4(a) is a three-dimensional diagram of an electronic device 1 in a folded state according to some embodiments of this application. FIG. 4(b) shows a cross-sectional view of a screen bearing plate 10, a flexible display panel 20, and a support plate 30 in FIG. 4(a) along N-N in FIG. 4(a). As shown in FIG. 4(b), when the electronic device 1 is in the folded state, a bendable mechanism 60, the screen bearing plate 10, and the flexible display panel 20 are all in the folded state, and a first midframe 40 and a second midframe 50 are disposed opposite each other. In the folded state, the flexible display panel 20 is bent, a second section 200, a third section 300, and a fourth section 400 of the screen bearing plate 10 are bent along an axis parallel to a second direction $S_2$. An end 100a, of a first section 100, away from the second section 200 is closer to an end 500a, of a fifth section 500, away from the fourth section 400, so that the first section 100 and the fifth section 500 are disposed opposite each other. A distance $d_1$ between an end 200a, of the second section 200, closer to the first section 100 and an end 400a, of the fourth section 400, closer to the fifth section 500 is less than a distance $d_2$ between two ends, 300a and 300b, of the third section 300.

The second section 200 and the fourth section 400 are bent outwards. In other words, a bending axis $l_1$ of the second section 200 is on an outer side of the screen bearing plate 10, and a bending axis $l_2$ of the fourth section 400 is on the outer side of the screen bearing plate 10. The third section 300 is bent inwards. In other words, a bending axis $l_3$ of the third section 300 is on an inner side of the screen bearing plate 10. It can be understood that, generally, the bending axis $l_1$ of the second section 200, the bending axis $l_3$ of the third section 300, and the bending axis $l_2$ of the fourth section 400 are parallel to each other. The screen bearing plate 10 is on an outer side of the flexible display panel 20. A first support plate 31, a second support plate 32, and a third support plate 33 are distributed in a triangle with three sides apart from each other and are on the outer side of the screen bearing plate 10. The first midframe 40, the bendable mechanism 60, and the second midframe 50 are on an outer side of the first support plate 31, the second support plate 32, and the third support plate 33. As the electronic device 1 in the example shown in this application is an inward-folding foldable device, the outer side is a side facing away from an illumination surface of the flexible display panel 20, and the inner side is a side facing toward the illumination surface of the flexible display panel 20.

In addition, the electronic device 1 may alternatively be unfolded or folded relatively to an intermediate state. The intermediate state may be any state between a flattened state and the folded state.

In some embodiments, in the folded state, there is no force between the support plate 30 and a flexible screen assembly 2 that are in the electronic device 1.

After the structure of the electronic device 1 is described, location relationships and connection relationships between structures of various components further need to be described. For clear description, a specific structure of a bendable mechanism 60 is first described below.

Figure 5A:
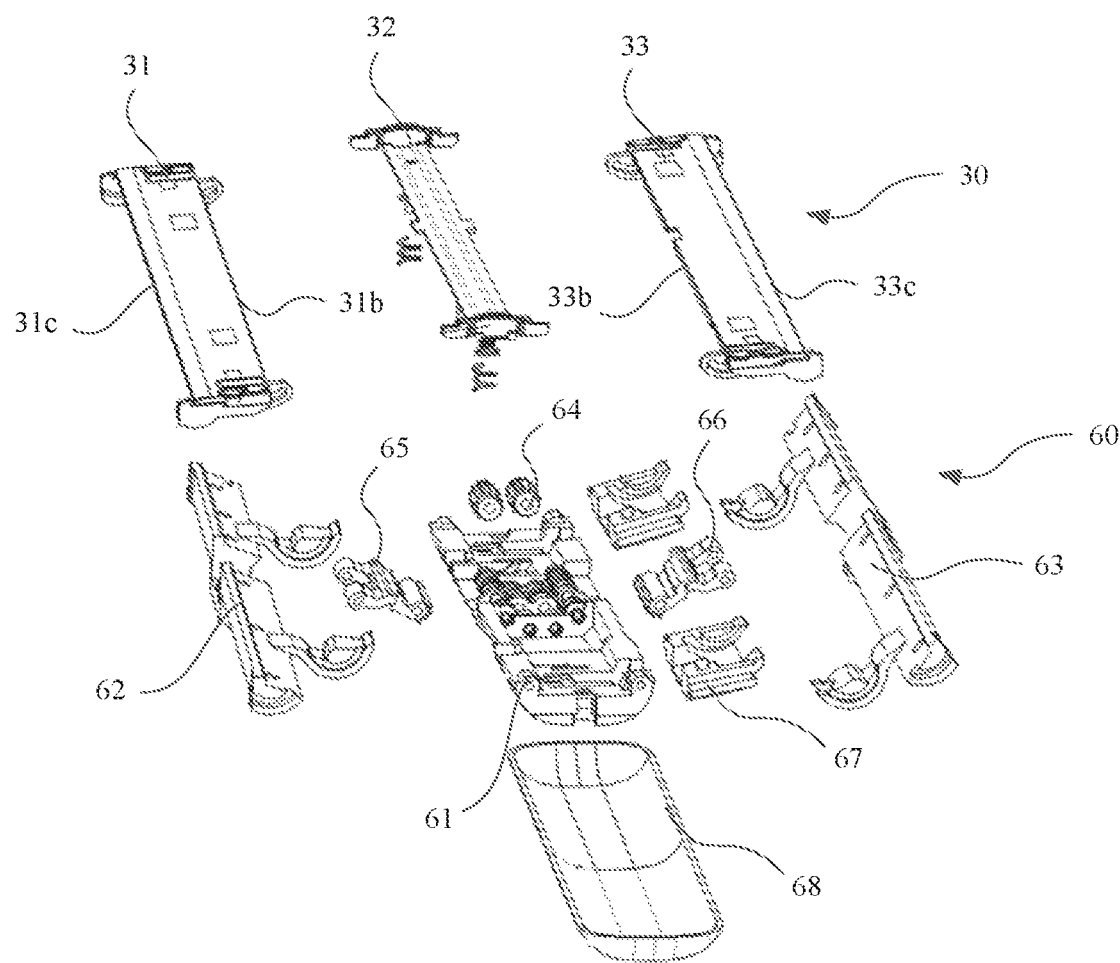
FIG. 5(a) is an exploded diagram of a support plate 30 and a bendable mechanism 60 according to some embodiments of this application.

FIG. 5(a) is an exploded diagram of a support plate 30 and a bendable mechanism 60 according to some embodiments of this application. As shown in FIG. 5(a), the bendable mechanism 60 includes an axle seat 61, a first bracket 62, a second bracket 63, a synchronization apparatus 64, a first synchronization arm 65, a second synchronization arm 66, a sliding block 67, and a housing 68.

Specifically, the first bracket 62 may be rotatably connected to the axle seat 61, the second bracket 63 may be rotatably connected to the axle seat 61, the first bracket 62 and the second bracket 63 are disposed opposite each other on two sides of the axle seat 61, and the axle seat 61 is mounted inside the housing 68. The synchronization apparatus 64 is configured to implement synchronous relative folding or relative flattening of the first midframe 40 and the second midframe 50. The synchronization apparatus 64 is rotatably connected to the interior of the axle seat 61. A movable end of the first synchronization arm 65 is in a sliding connection to the first bracket 62, and the movable end of the first synchronization arm 65 is further rotatably connected to the first bracket 62. A synchronization end of the first synchronization arm 65 is rotatably connected to the axle seat 61, and the synchronization end of the first synchronization arm 65 engages with the synchronization apparatus 64. In a process in which the first bracket 62 and the second bracket 63 rotate relative to the axle seat 61, the first synchronization arm 65 affects a rotation angle of the first bracket 62, and the second synchronization arm 66 affects a rotation angle of the second bracket 63. In this way, in a process in which the first synchronization arm 65 and the second synchronization arm 66 rotate synchronously relative to the axle seat 61, the first bracket 62 and the second bracket 63 are driven to keep rotating synchronously relative to the axle seat 61. The sliding block 67 is disposed on the axle seat 61, and the sliding block 67 is in a sliding connection to the axle seat 61. The first bracket 62 and the second bracket 63 are rotatably connected to the sliding block 67, that is, the first bracket 62 and the second bracket 63 are rotatably connected to the axle seat 61 by using the sliding block 67.

After the specific structure of the bendable mechanism 60 is described, location relationships and connection relationships between structures of various components are further described in detail with reference to FIG. 3(a) to FIG. 5(c).

In some embodiments, the screen bearing plate 10 bonds with and is fixed to the flexible display panel 20 through an adhesive layer.

In an implementation, the flexible display panel 20 bonds with and is fixed to a local area of the screen bearing plate 10 through the adhesive layer. The local area is a part, of the screen bearing plate 10, other than the third section 300. In another implementation, the screen bearing plate 10 bonds with and is fixed to all areas of the flexible display panel 20 through the adhesive layer.

Figure 5B:
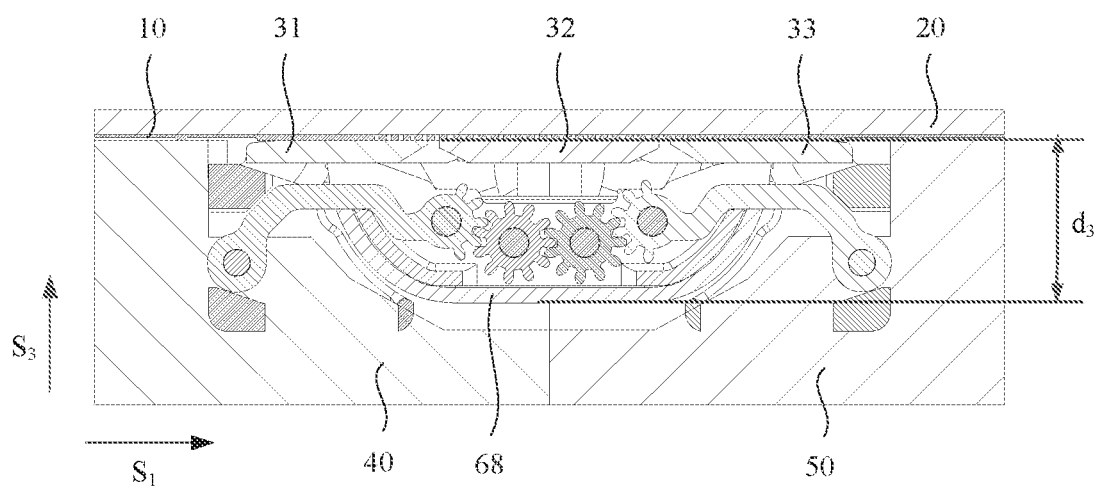
FIG. 5(b) shows a cross-sectional view of a support plate 30 and a bendable mechanism 60 along N-N in FIG. 4(b) when an electronic device 1 is in a folded state according to some embodiments of this application.
Figure 5C:
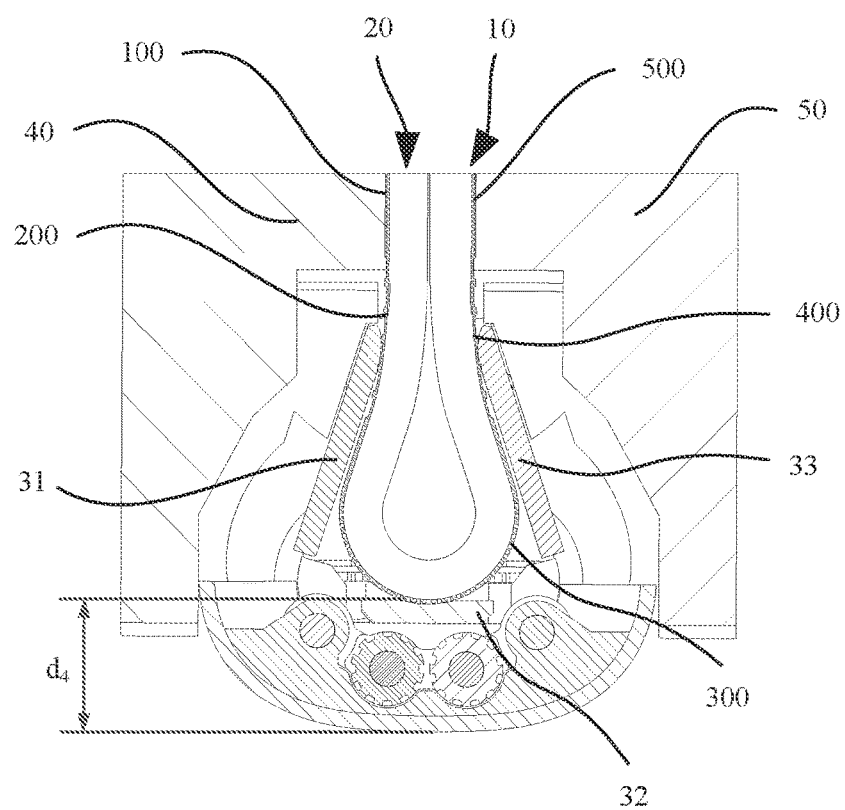
FIG. 5(c) shows a cross-sectional view of a support plate 30 and a bendable mechanism 60 along N-N in FIG. 4(a) when an electronic device 1 is in a flattened state according to some embodiments of this application.

The second support plate 32 is mounted to the axle seat 61. In a process in which the bendable mechanism 60 switches between the flattened state and the folded state, the second support plate 32 can move relative to the axle seat 61 along a thickness direction $S_3$. To be specific, the second support plate 32 moves along the thickness direction $S_3$ in a direction away from the axle seat 61, or the second support plate 32 moves along the thickness direction $S_3$ in a direction closer to the axle seat 61. In other words, the second support plate 32 is a plate that can move up and down, the second support plate 32 is connected to the axle seat 61 in a rise-and-drop manner. For example, FIG. 5(b) shows a cross-sectional view of the support plate 30 and the bendable mechanism 60 along N-N in FIG. 4(b) when the electronic device 1 is in the folded state according to some embodiments of this application. As shown in FIG. 5(b), when the electronic device 1 is in the flattened state, a maximum distance between the second support plate 32 and the housing of the bendable mechanism 60 is a first distance $d_3$. FIG. 5(c) shows a cross-sectional view of the support plate 30 and the bendable mechanism 60 along N-N in FIG. 4(a) when the electronic device 1 is in the flattened state according to some embodiments of this application. As shown in FIG. 5(c), when the electronic device 1 is in the folded state, a maximum distance between the second support plate 32 and the housing of the bendable mechanism 60 is a second distance $d_4$. The first distance $d_3$ is greater than the second distance $d_4$. In the foregoing structure, in an unfolding process, the second support plate 32 moves in a direction away from the housing 68. To be specific, the second support plate 32 gradually rises, to support the flexible display panel 20. In a folding process, the second support plate 32 moves in a direction closer to the housing 68. To be specific, the second support plate 32 gradually drops, to cooperate with the first support plate 31 and the third support plate 33 to jointly form an accommodating space for accommodating the flexible display panel 20. In an implementation, the bendable mechanism 60 includes an elastic connection structure. The second support plate 32 is elastically connected to the axle seat 61 by using the elastic connection structure, and in a folding process of the bendable mechanism 60, the elastic connection structure drives the second support plate 32 to move along the thickness direction $S_3$ toward the axle seat 61. The foregoing elastic connection structure has a simple structure, is easy to operate, and can precisely control the second support plate 32 to rise or drop.

The first support plate 31 is rotatably connected to the first bracket 62, and the first support plate 31 is in a sliding connection to the axle seat 61. The first support plate 31 may rotate relative to the first bracket 62, and at the same time, the first support plate 31 may slide relative to the axle seat 61. The first support plate 31 and the third support plate 33 are distributed on two sides of the second support plate 32. The third support plate 33 is rotatably connected to the second bracket 63, and the third support plate 33 is in a sliding connection to the axle seat 61. The third support plate 33 may rotate relative to the second bracket 63, and may further slide relative to the axle seat 61 at the same time.

In some embodiments, the screen bearing plate 10 further includes a sixth section 600 and a seventh section 700, and the first section 100, the second section 200, the sixth section 600, the third section 300, the seventh section 700, the fourth section 400, and the fifth section 500 are sequentially disposed along the first direction $S_1$. The first midframe 40 and the second midframe 50 are fixedly connected to the screen bearing plate 10 separately.

In some embodiments, the first support plate 31 is connected to at least a part of the sixth section 600, and the third support plate 33 is connected to at least a part of the seventh section 700. The first section 100 of the screen bearing plate 10 is mounted to the first midframe 40, and the fifth section 500 is mounted to the second midframe 50. In the folded state, the second section 200, the third section 300, and the fourth section 400 each are bent, and the second section 200, the sixth section 600, the third section 300, the seventh section 700, and the fourth section 400 jointly form a specific shape. In a process in which the first midframe 40 and the second midframe 50 are relatively unfolded or folded, the first midframe 40 drives the first section 100 to move, the second midframe 50 drives the fifth section 500 to move, the first section 100 and the fifth section 500 are relatively folded or unfolded, and the second section 200, the third section 300, and the fourth section 400 of the flexible display panel 20 are deformed. It can be understood that a connection manner of the third support plate 33 is similar to that of the first support plate 31. Details are not described herein again.

In some implementations, the sixth section 600 of the screen bearing plate 10 may be fixedly connected to, for example, may bond with and be fixed to, through an adhesive layer, a part of the support surface 32a of the first support plate 31. The seventh section 700 may be fixedly connected to, for example, may bond with and be fixed to, through an adhesive layer, a part of the support surface 33a of the third support plate 33. It can be understood that an adhesive layer between the first section 100 and the first midframe 40, the adhesive layer between the sixth section 600 and the first support plate 31, the adhesive layer between the seventh section 700 and the third support plate 33, and an adhesive layer between the fifth section 500 and the second midframe 50 may each be a continuous adhesive layer over an entire surface, may each be an adhesive layer with intermittent dots, or may each be an adhesive layer with a hollowed-out area. A solution of the adhesive layers is not specifically limited in embodiments of this application, and any adhesive layer that can connect the foregoing components falls within the protection scope of this application.

The continuous adhesive layer over an entire surface can provide a bonding force strong enough for two components that need to bond with each other, to ensure bonding stability of the two components. The adhesive layer with intermittent dots bonds two components together at a required bonding point to prevent the adhesive layer from overflowing or being exposed, to prevent dust, water vapor, and the like from being attached between the two components.

After the main components of the screen bearing plate 10 are described, rigidity of various sections and subsections is compared below in detail.

Figure 5D:
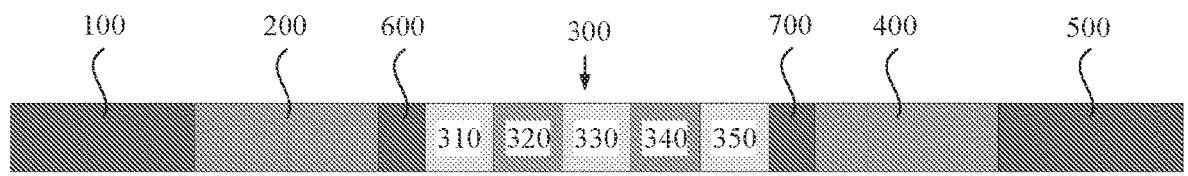
FIG. 5(d) is a schematic diagram of rigidity of a screen bearing plate 10 in an electronic device 1 according to some embodiments of this application.

FIG. 5(d) is a schematic diagram of values of rigidity of the screen bearing plate 10. An area with a darker fill color indicates higher rigidity, and an area with a lighter fill color indicates lower rigidity. As shown in FIG. 5(d), rigidity of the first section 100 and the fifth section 500 is higher than rigidity of the second section 200, the third section 300, and the fourth section 400. Rigidity of the third section 300 is lower than rigidity of the second section 200 and the fourth section 400. In addition, rigidity of the first subsection 310, the third subsection 320, and the fifth subsection 350 of the third section 300 is lower than rigidity of the second subsection 320 and the fourth subsection 340 of the third section 300.

In addition, a relationship between the rigidity of the second subsection 320 and the fourth subsection 340 and the rigidity of the second section 200 and the fourth section 400 is not specifically limited, and the rigidity of the second subsection 320 and the fourth subsection 340 may be slightly higher than, slightly lower than, or equal to the rigidity of the second section 200 and the fourth section 400. The rigidity of the first subsection 310, the third subsection 320, and the fifth subsection 350 is lower than the rigidity of the second section 200 and the fourth section 400. Rigidity of the sixth section 600 and the seventh section 700 is not specifically limited. In principle, the rigidity needs to be higher than the rigidity of the second section 200, the third section 300, and the fourth section 400. For example, the rigidity of the sixth section 600 and the seventh section 700 is equal to the rigidity of the first section 100 and the fifth section 500.

As the rigidity of the second section 200, the third section 300, and the fourth section 400 is all lower than the rigidity of the first section 100 and the fifth section 500, when rigidity is represented by a volume actually occupied by a material or a structure per unit volume, a thickness reducing area is provided in each of the second section 200, the third section 300, and the fourth section 400. The thickness reducing area refers to an area of a thickness less than an overall thickness of the screen bearing plate 10. A hollowed-out structure corresponding to the thickness reducing area is disposed on the adhesive layer, to ensure that the second section 200 fully bonds with the first support plate 31, the third section 300 fully bonds with the second support plate 32, and the fourth section 400 fully bonds with the third support plate 33, and avoid that a part of the adhesive layer is exposed to the thickness reducing area after the bonding is completed.

Based on this, the adhesive layer with the hollowed-out area is particularly applicable to bonding between the second section 200 and the first midframe 40, between the third section 300 and the first support plate 31, between the third section 300 and the second support plate 32, between the third section 300 and the third support plate 33, and between the fourth section 400 and the second midframe 50. In the foregoing implementation, the large adhesive layer with the hollowed-out area is used, to implement once-and-for-all bonding between a plurality of components such as the second section 200, the third section 300, the fourth section 400, the first midframe 40, the second midframe 50, the first support plate 31, the second support plate 32, and the third support plate 33, so that a step for bonding is simplified, bonding efficiency is improved, and exposure of an adhesive layer in an area, for example, of a long-strip-shaped through hole or a groove, thereby improving bonding stability of the components. In this way, service life of the electronic device is prolonged.

In addition, the adhesive layer with the hollowed-out area may be further applicable to a connection between the screen bearing plate and the flexible display panel.

In addition, in a process in which the electronic device 1 switches between the flattened state and the folded state, locations of the first support plate 31, the second support plate 32, and the third support plate 33 relative to each other change. In other words, the second section 200 cannot fully bond with the first support plate 31, the third section 300 cannot fully bond with the second support plate 32, and the fourth section 400 cannot fully bond with the third support plate 33. Therefore, a hollowed-out part may be disposed in an area, on the entire adhesive layer, other than an area in which the second section 200 is connected to the first support plate 31, an area in which the third section 300 is connected to the second support plate 32, and an area in which the fourth section 400 is connected to the third support plate 33, to avoid bonding and a disconnection between components in the process in which the electronic device switches between the folded state and the flattened state, thereby improving smoothness of operations of folding and unfolding the electronic device, and improving user experience.

In some implementations, a manner of connecting the first midframe 40 and the bendable mechanism 60, and a manner of connecting the second midframe 50 and the bendable mechanism 60 may be fixed mounting by fastening by using a fastening structure, welding, bonding, or a snapping connection.

Specifically, the first bracket 62 is fixedly connected to the first midframe 40, and the second bracket 63 is fixedly connected to the second midframe 50. Therefore, when the first bracket 62 rotates relative to the axle seat 61 and the second bracket 63 rotates relative to the axle seat 61, the first midframe 40 moves relative to the second midframe 50, the first bracket 62 drives the first midframe 40 and the second bracket 63 drives the second midframe 50 to relatively fold or unfold.

In the folding process of the bendable mechanism 60, with reference to FIG. 4(b) and FIG. 5, it can be learned that an end 31b, of the first support plate 31, closer to the second support plate 32 moves in a direction away from the second support plate 32. Similarly, an end 33b, of the third support plate 33, closer to the second support plate 32 moves in a direction away from the second support plate 32. An end 31c, of the first support plate 31, away from the second support plate 32 and an end 33c, of the third support plate 33, away from the second support plate 32 get closer to each other. The second support plate 32 moves in a direction closer to the axle seat 61.

In the foregoing structure, the first support plate 31, the second support plate 32, and the third support plate 33 can move to form the accommodating space (not marked out) for accommodating the flexible display panel 20. A dimension of an area, of the accommodating space, adjacent to the second support plate 32 is larger, and a dimension of an area away from the second support plate 32 is smaller. In this way, after the bendable mechanism 60 is folded, a crease on the flexible display panel 20 correspondingly disposed over the bendable mechanism 60 is not obvious, so that damage to the flexible display panel 20 in a process of bending can be avoided.

In an unfolding process of the bendable mechanism 60, the end 31c, of the first support plate 31, away from the second support plate 32 moves in a direction away from the axle seat 61, and the end 33c, of the third support plate 33, away from the second support plate 32 moves in a direction away from the axle seat 61. When the electronic device 1 is completely in the flattened state, the support surface 31a of the first support plate 31 and a support surface 32a of the second support plate 32 are flush with the support surface 33a of the third support plate 33, so that the screen bearing plate 10 and the flexible display panel 20 are in the flattened state.

In the foregoing structure, when a user performs a touch operation, the first support plate 31, the second support plate 32, and the third support plate 33 can provide strong support for flatness of the flexible display panel 20, thereby improving user operation experience and viewing experience.

In some embodiments, the first direction $S_1$ is a height direction of the electronic device 1, and the second direction $S_2$ is a width direction of the electronic device 1. In some other implementations, the first direction $S_1$ is a width direction of the electronic device 1, and the second direction $S_2$ is a height direction of the electronic device 1.

In some embodiments, the flexible display panel 20 may be an organic light-emitting diode (organic light-emitting diode, OLED) display screen, an active-matrix organic light-emitting diode (active-matrix organic light-emitting diode, AMOLED) display screen, a mini light-emitting diode (mini light-emitting diode) display screen, a micro light-emitting diode (micro light-emitting diode) display screen, a micro organic light-emitting diode (micro organic light-emitting diode) display screen, or a quantum dot light-emitting diode (quantum dot light-emitting diode, QLED) display screen.

In some embodiments, the electronic device 1 may further include a plurality of internal modules (not shown in the figure) accommodated in the support apparatus 3. The plurality of modules include, but are not limited to, a mainboard, a processor, a memory, a battery, a camera module, an earpiece module, a speaker module, a microphone module, an antenna module, a sensor module, and the like. This is not specifically limited in this application.

Figure 6A:
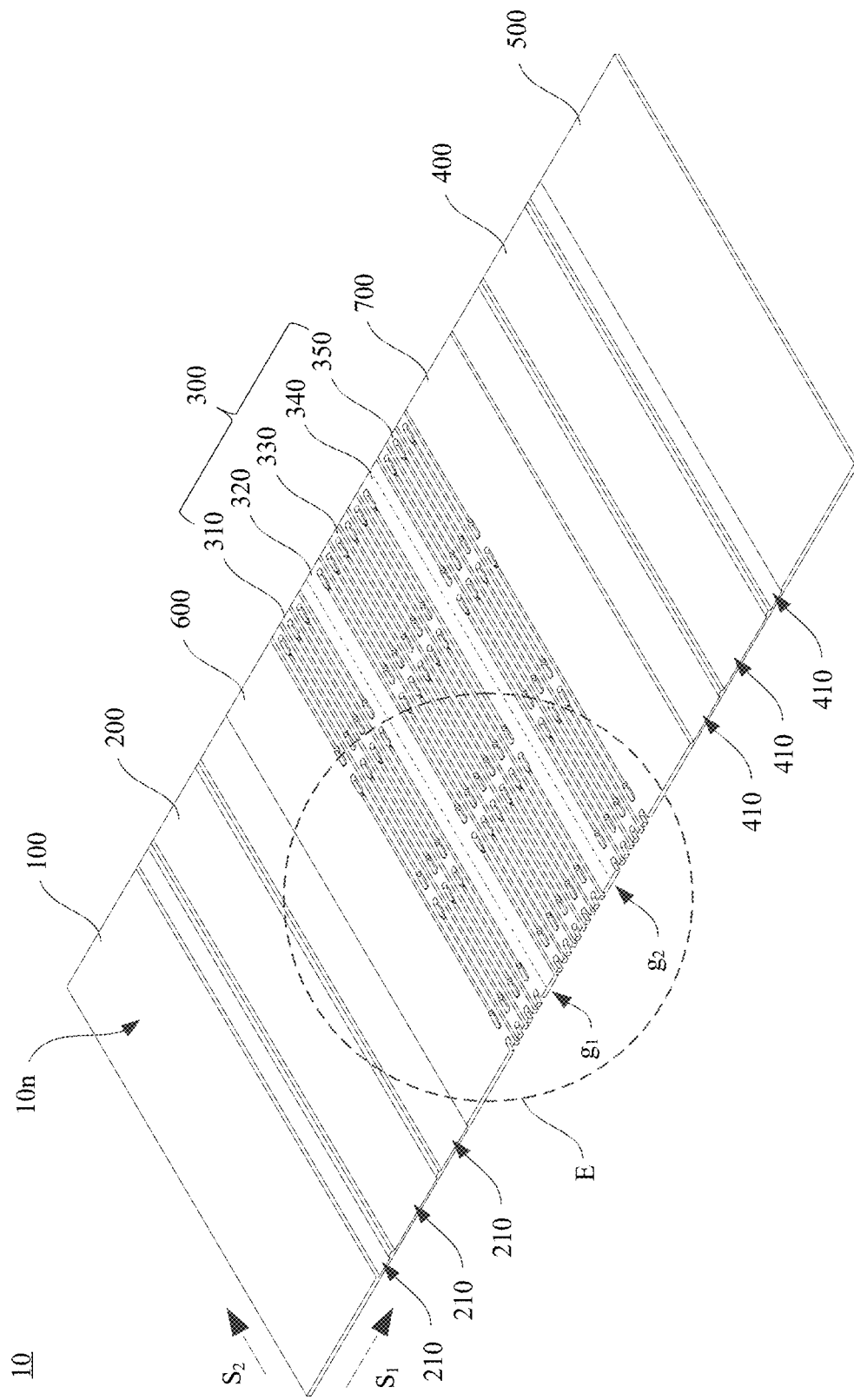
FIG. 6(a) is a comparison diagram of a gap projection when a screen bearing plate 10 in an area D in FIG. 3(b) is in a flattened state according to some embodiments of this application.

FIG. 6(a) is a three-dimensional diagram of a screen bearing plate 10 in a flattened state according to some embodiments of this application. Three-dimensional view angles in FIG. 6(a) and FIG. 3(a) are different. In FIG. 6(a), a projection $g_1$ is a projection, of the first gap Gap 1 in FIG. 3(e), on the back side 10b of the screen bearing plate, and the projection $g_1$ is within the second subsection 320. A projection $g_2$ is a projection, of the second gap Gap 2, on the back side 10b of the screen bearing plate in FIG. 6(a), and the projection $g_2$ within the fourth subsection 340. It can be understood that, due to limitations of a dimension and resolution, the projection of the gap is simplified into a line. A structure of the screen bearing plate 10 in this application is described in detail with reference to FIG. 6(a).

As shown in FIG. 6(a), a third section 300 of the screen bearing plate 10 includes a first subsection 310, a second subsection 320, a third subsection 330, a fourth subsection 340, and a fifth subsection 350 that are sequentially disposed along a first direction $S_1$. Rigidity of the second subsection 320 and the fourth subsection 340 is higher than rigidity of the first subsection 310, the third subsection 330, and the fifth subsection 350. In other words, the first subsection 310, the third subsection 330, and the fifth subsection 350 have better bending performance, and the second subsection 320 and the fourth subsection 340 have better supporting performance.

With reference to FIG. 6(a) and FIG. 3(e), it can be learned that the first subsection 310 corresponds to a first support plate 31, the third subsection 330 corresponds to a second support plate 32, and the fifth subsection 350 corresponds to a third support plate 33. The second subsection 320 corresponds to the first gap Gap 1 between the first support plate 31 and the second support plate 32, and the fourth subsection 340 corresponds to the second gap Gap 2 between the second support plate 32 and the third support plate 33.

Figure 6B:
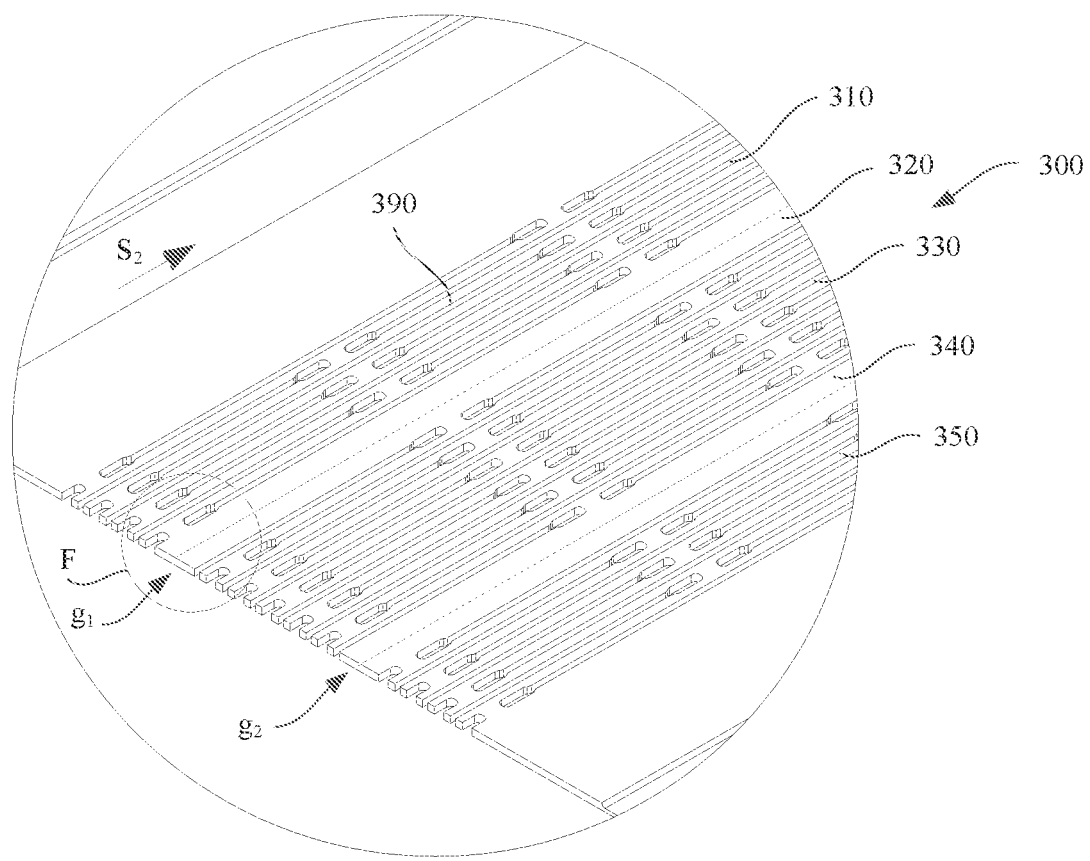
FIG. 6(b) shows a partial enlarged view of an area E in FIG. 6(a)

FIG. 6(b) shows a partial enlarged view of an area E in FIG. 6(a). As shown in FIG. 6(b), in some embodiments, long-strip-shaped through holes 390 are provided in the first subsection 310, the third subsection 330, and the fifth subsection 350 of the third section 300. The long-strip-shaped through holes 390 connect a front side 10m of the screen bearing plate and the back side 10n of the screen bearing plate. Each of the long-strip-shaped through holes 390 extends along a second direction $S_2$, and the plurality of long-strip-shaped through holes 390 are staggered and adjacent to each other along the first direction $S_1$.

In the foregoing implementation, by providing the long-strip-shaped through holes 390 extending along the second direction $S_2$ in the first subsection 310, the third subsection 330, and the fifth subsection 350, rigidity of the first subsection 310, the third subsection 330, and the fifth subsection 350 along the first direction $S_1$ is reduced, to improve bendability of the screen bearing plate 10 around an axis parallel to the second direction $S_2$. In addition, the layout with which the long-strip-shaped through holes 390 are staggered and adjacent to each other along the first direction $S_1$ ensures rigidity of the first subsection 310, the third subsection 330, and the fifth subsection 350 along the second direction $S_1$, to improve strength of support provided by the screen bearing plate 10 for the flexible display panel 20 in the flattened state, thereby improving user experience and prolonging service life of the screen assembly and the electronic device.

As shown in FIG. 6(b), in some embodiments, a cross-sectional shape, of each of the long-strip-shaped through holes 390, parallel to a plate surface of the screen bearing plate 10, is a dumbbell. A middle part of the dumbbell is a long-strip-shaped structure, racetrack-like structures that each are of a width greater than that of the middle part is disposed at two ends of the long-strip-shaped structure, and the racetrack-like structures each are a structure with flat edges in the middle and arc-shaped transition edges at two ends. In the foregoing structure, the long-strip-shaped through holes 390 in the first subsection 310, the third subsection 330, and the fifth subsection 350 are disposed as dumbbell-shaped. First, a large dimension in the second direction $S_2$ ensures bendability of the third section 300 around the axis parallel to the second direction $S_2$. Second, in the first direction $S_1$, a larger dimension of the racetrack-like structures at the two ends can improve bendability of the third section 300 and avoid cracks at the two ends in a process of bending. A smaller dimension of the middle part is for increasing a dimension of an entity between two adjacent long-strip-shaped through holes 390 in the flattened state, to improve overall rigidity of the third section 300.

It can be understood that the dumbbell is only an example of a cross-sectional shape, of each of the long-strip-shaped through holes 390, parallel to the plate surface of the screen bearing plate 10. The cross-sectional shape, of the long-strip-shaped through hole 390, parallel to the plate surface of the screen bearing plate 10 may be a shape of a strip, a racetrack, a dumbbell, or the like. This is not specifically limited in this application. The cross-sectional shape, of the long-strip-shaped through hole 390, parallel to the plate surface of the screen bearing plate 10 is described below together with hole structures 380 in the second subsection 320 and the fourth subsection 340.

To improve bending performance of the second section 200 and the fourth section 400, it can be further learned from FIG. 6(a) that, in some embodiments, second bending grooves 210 are disposed on a surface, of the second section 200, facing away from the flexible display panel 20, and third bending grooves 410 are disposed on a surface, of the fourth section 400, facing away from the flexible display panel 20. Both the second bending grooves 210 and the third bending grooves 410 extend along the second direction $S_2$.

To further improve user experience, it can be further learned from FIG. 6(a) that, in some embodiments, the second bending grooves 210 and the third bending grooves 410 are disposed on the back side 10n of the screen bearing plate 10, that is, the second bending grooves 210 and the third bending grooves 410 are disposed on a side, of the screen bearing plate 10, facing away from the flexible display panel 20.

Figure 6C:
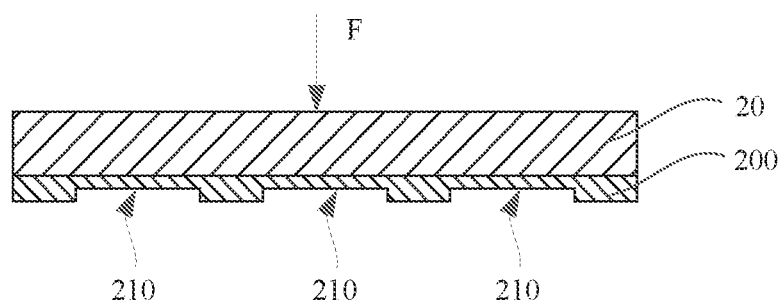
FIG. 6(c) is a schematic diagram of an overlap between a second section 200 and a flexible display panel 20 according to some embodiments of this application.
Figure 6D:
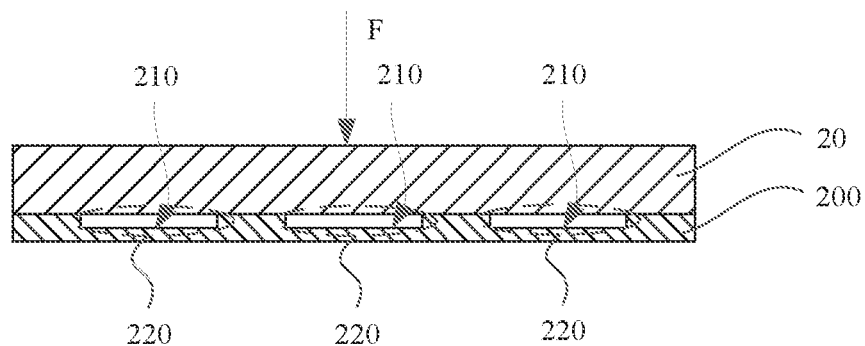
FIG. 6(d) is a schematic diagram of an overlap between a second section 200 and a flexible display panel 20 according to some other embodiments of this application.

FIG. 6(c) is a schematic diagram of an overlap between a second section 200 and a flexible display panel 20 according to some embodiments of this application. FIG. 6(d) is a schematic diagram of an overlap between a second section 200 and a flexible display panel 20 according to some other embodiments of this application. It can be learned by comparing FIG. 6(c) with FIG. 6(d) that, in FIG. 6(c), an opening of each of the second bending grooves 210 faces the support plate 30, and a bottom faces the flexible display panel 20, so that when an external load F is received, for example, when a user touches the flexible display panel 20, the flexible display panel 20 is supported by the bottom, to avoid, as much as possible, a void 220 caused at the opening when the second bending groove 210 is reversely disposed according to FIG. 6(d), thereby improving user experience of touching and prolonging service life of the flexible display panel 20. Similarly, a manner of disposing an opening and a bottom of each of the third bending grooves 410 is similar to a manner of disposing the second bending groove 210. Details are not described herein again.

Based on this, a correspondence between the second subsection 320 and the first gap Gap 1 between the first support plate 31 and the second support plate 32, and a correspondence between the fourth subsection 340 and the second gap Gap 2 between the second support plate 32 and the third support plate 33 are described below in detail.

In some application scenarios, with reference to FIG. 3(e) and FIG. 6(a), it can be learned that the first gap Gap 1 and the second gap Gap 2 are in a form of straight lines extending along the second direction $S_2$. In some embodiments, the second subsection 320 covers the first gap Gap 1, and the fourth subsection 340 covers the second gap Gap 2.

Figure 7A:
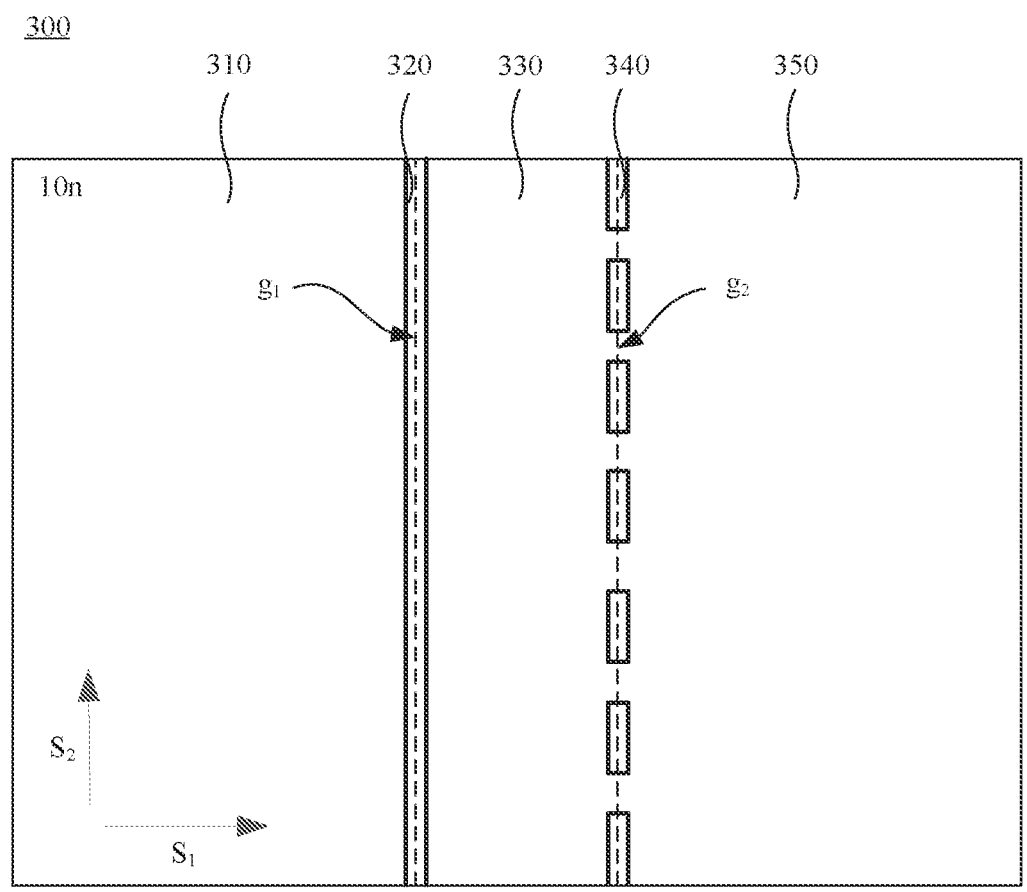
FIG. 7(a) is a schematic diagram of a third section 300 of a screen bearing plate 10 according to some embodiments of this application.

FIG. 7(a) is a schematic diagram of a third section 300 of a screen bearing plate 10 when a first gap Gap 1 and a second gap Gap 2 extend along a straight line according to some embodiments of this application. As shown in FIG. 7(a), a projection $g_1$, on a back side 10b of the screen bearing plate, of the first gap Gap 1 between a first support plate 31 and a second support plate 32 is a straight line extending along a second direction $S_2$, a second subsection 320 is a long-strip-shaped area covering the projection $g_1$ (that is, the first gap Gap 1 between the first support plate 31 and the second support plate 32), and the second subsection 320 extends along the second direction $S_2$. A projection $g_2$, on the back side 10b of the screen bearing plate, of the second gap Gap 2 between the second support plate 32 and a third support plate 33 is a straight line extending along the second direction $S_2$, a fourth subsection 340 is a plurality of long-strip-shaped areas locally covering the projection $g_2$ (that is, the second gap Gap 2 between the second support plate 32 and the third support plate 33), and the fourth subsection 340 extends along the second direction $S_2$.

In some implementations, edges of the second subsection 320 that are parallel to the second direction $S_2$ are symmetrically distributed on two sides of the projection $g_1$, and edges of the fourth subsection 340 that are parallel to the second direction $S_2$ are symmetrically distributed on two sides of the projection $g_2$. Based on this, support plates on two sides of a gap can evenly support the second subsection and/or the fourth subsection, to ensure that the support plate 30, the flexible display panel 20, and the screen bearing plate 10 take a force evenly, avoiding structural damage caused by uneven force, and prolonging service life of the support plate 30, the flexible display panel 20, the screen bearing plate 10, and the electronic device.

Figure 6E:
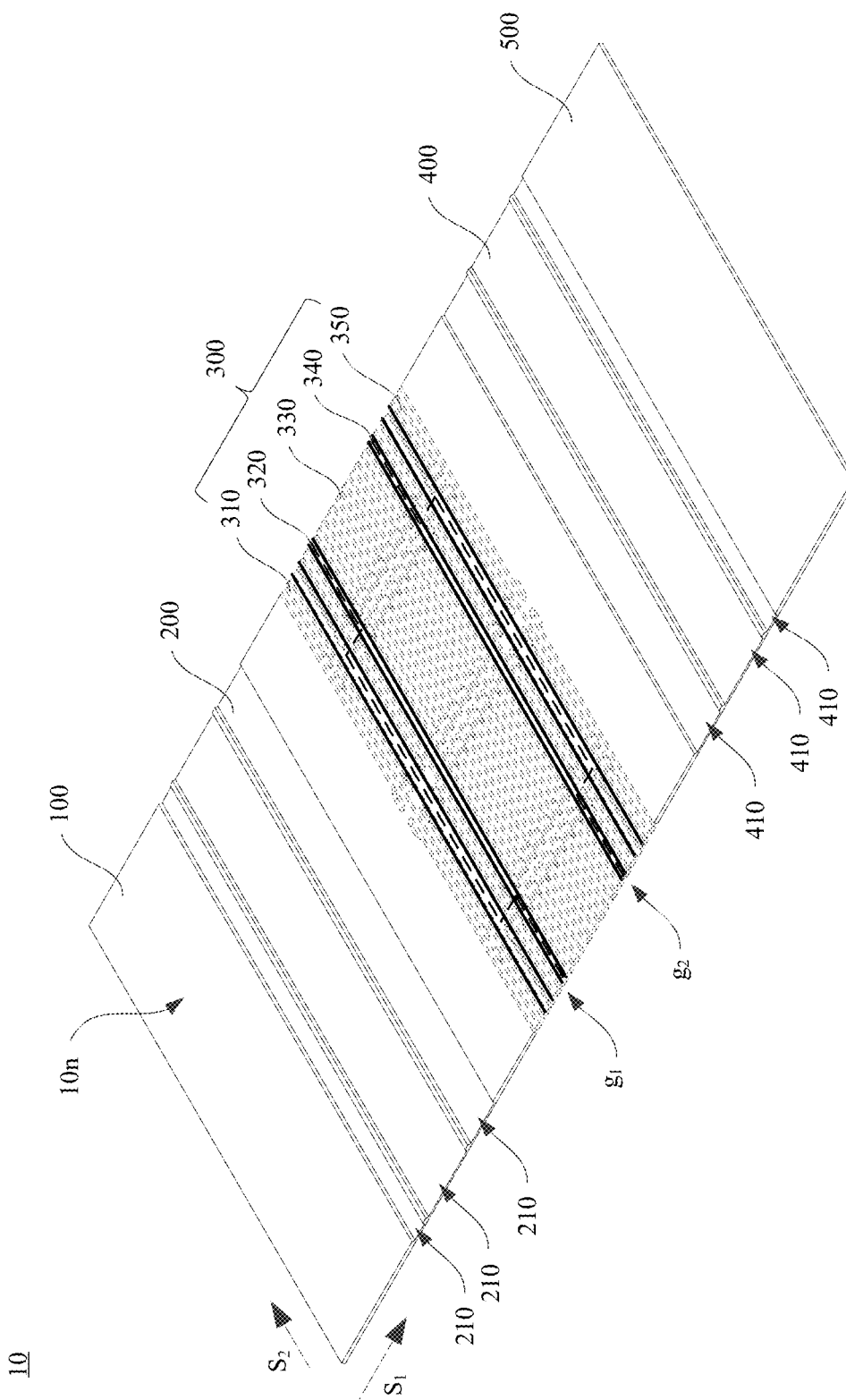
FIG. 6(e) is a comparison diagram of a gap projection when a screen bearing plate 10 in an area D in FIG. 3(b) is in a flattened state according to some other embodiments of this application.
Figure 6F:
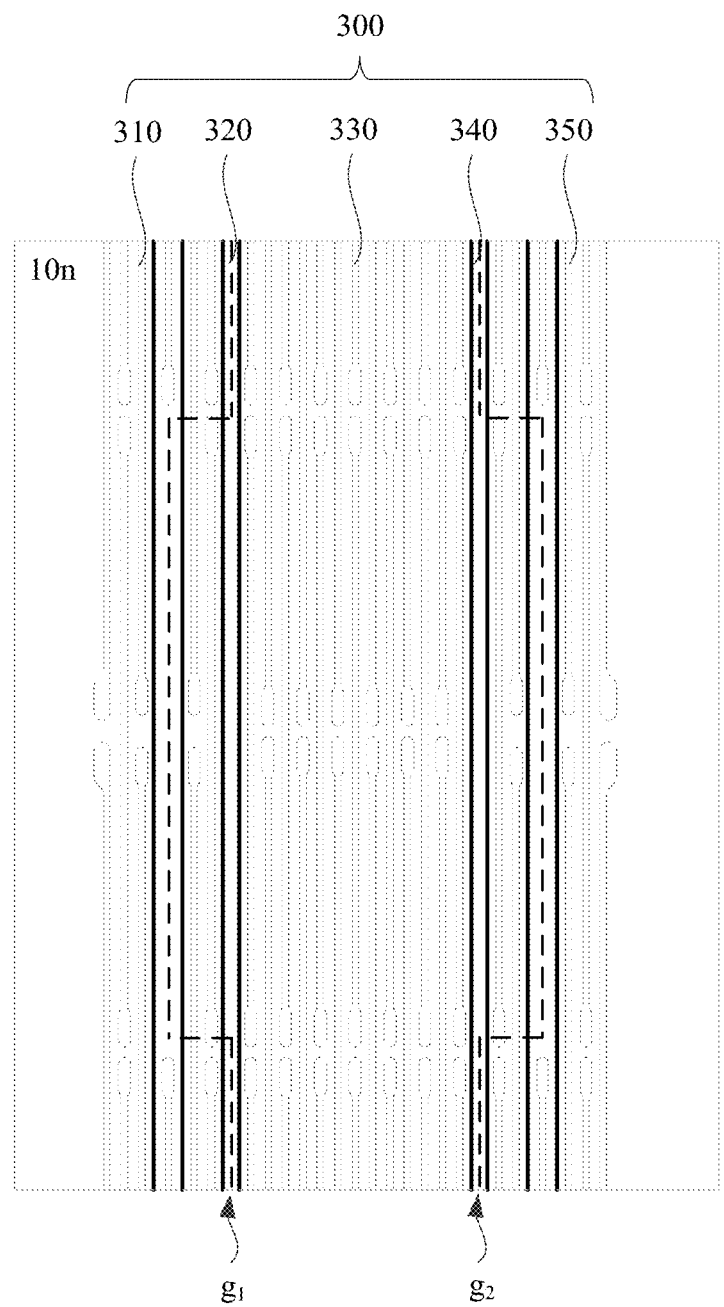
FIG. 6(f) shows a top view of a gap projection when a screen bearing plate 10 in an area D in FIG. 3(b) is in a flattened state according to some other embodiments of this application.

In some other application scenarios, the first gap Gap 1 and the second gap Gap 2 are not in a form of straight lines extending along the second direction $S_2$. As shown in FIG. 6(e) and FIG. 6(f), the first gap Gap 1 between the first support plate 31 and the second support plate 32, and the second gap Gap 2 between the second support plate 32 and the third support plate 33 extend along broken lines.

For the application scenarios represented by FIG. 6(e) and FIG. 6(f), in this application, extension forms of the second subsection 320 and the fourth subsection 340 need to be adaptively adjusted based on an actual form of the gaps, to completely cover the first gap Gap 1 between the first support plate 31 and the second support plate 32, and the second gap Gap 2 between the second support plate 32 and the third support plate 33.

Figure 7B:
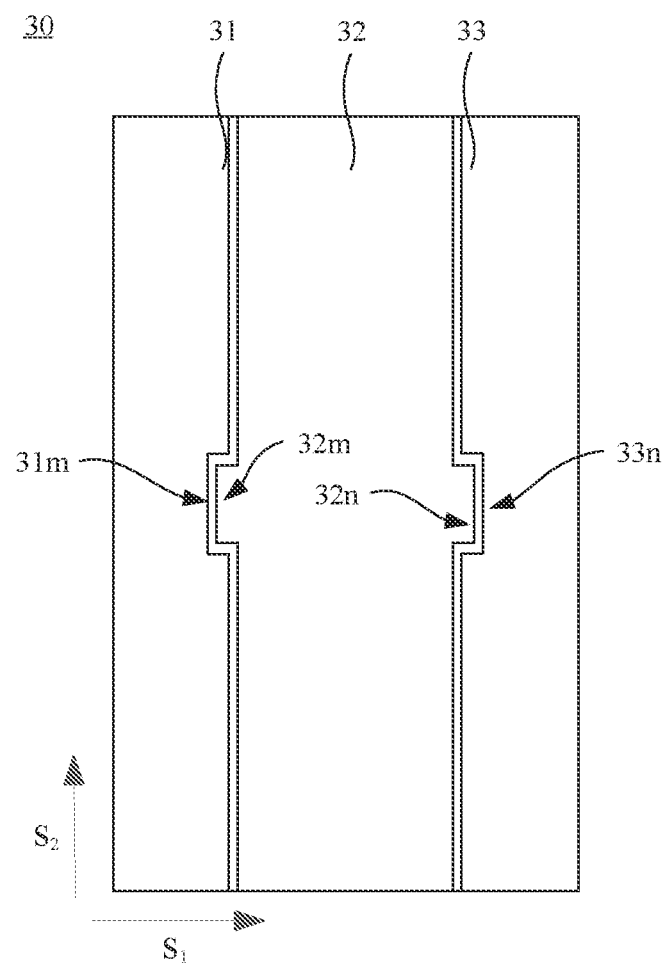
FIG. 7(b) is a schematic diagram of a support plate 30 in a screen bearing plate 10 according to some embodiments of this application.

In some application scenarios, to prevent interference between the bendable mechanism 60 and the support plate 30 in a folding process, in some implementations, an opening (or a notch) is provided on the support plate 30. To implement stable support of the support plate 30 for the screen bearing plate 10 and the flexible display panel, a plate structure that corresponds to a location of the opening (or the notch) and that has a corresponding dimension further needs to be added. As shown in FIG. 7(b), the first support plate 31 is provided with a first notch 31m used to prevent interference with the bendable mechanism 60, and the second support plate 32 is provided with a first protrusion 32m that matches with the first notch 31m. The third support plate 33 is provided with a third notch 33n used to prevent interference with the bendable mechanism 60, and the second support plate 32 is provided with a second protrusion 32n that matches with the third notch 33n. Based on this, as shown in FIG. 7(c), FIG. 7(d), FIG. 7(e), and FIG. 7(f), the projection $g_1$ includes three segments, that is, a first segment of projection $g_{11}$, a second segment of projection $g_{12}$, and a third segment of projection $g_{13}$. The first segment of projection $g_{11}$ and the third segment of projection $g_{13}$ are distributed on a same straight line and parallel to a bending axis. The second segment of projection $g_{12}$ corresponds to the first notch 31m on the first support plate 31 and the first protrusion 32m on the second support plate 32. Similarly, the projection $g_2$ includes three segments, that is, a first segment of projection $g_{21}$, a second segment of projection $g_{11}$ and a third segment of projection $g_{23}$. The first segment of projection $g_{21}$ and the third segment of projection $g_{23}$ are distributed on a same straight line and parallel to a bending axis. The second segment of projection $g_{22}$ corresponds to the third notch 33n on the third support plate 33 and the second protrusion 32n on the second support plate 32. Several solutions for adjusting extension forms of the second subsection 320 and the fourth subsection 340 are described below in detail based on the foregoing application scenarios.

Figure 7C:
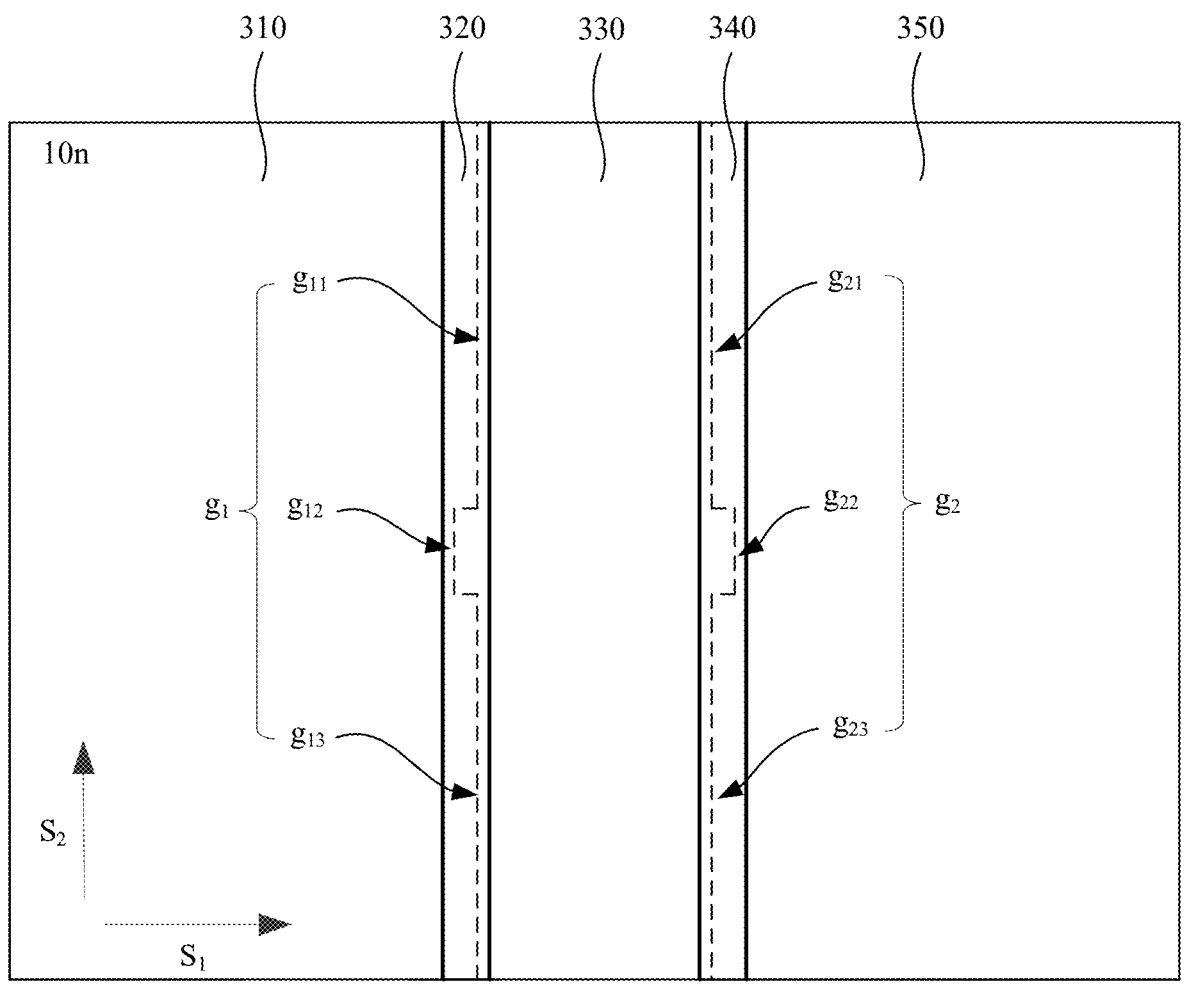
FIG. 7(c) is a schematic diagram of a third section 300 of a screen bearing plate 10 according to some other embodiments of this application.

FIG. 7(c) is a schematic diagram of a third section 300 of a screen bearing plate 10 according to some other embodiments of this application. As shown in FIG. 7(c), the second subsection 320 is a long-strip-shaped area covering the projection $g_1$ (that is, the first gap Gap 1 between the first support plate 31 and the second support plate 32), and the second subsection 320 extends along the second direction $S_2$. To be specific, the second subsection 320 is a long-strip-shaped area covering the entire first gap Gap 1 including an edge of the first notch 31m on the first support plate 31 and an edge of the first protrusion 32m on the second support plate 32. The fourth subsection 340 is a long-strip-shaped area covering the projection $g_2$ (that is, the second gap Gap 2 between the second support plate 32 and the third support plate 33), and the fourth subsection 340 extends along the second direction $S_2$. To be specific, the fourth subsection 340 is a long-strip-shaped area covering the entire second gap Gap 2 including an edge of the third notch 33n on the third support plate 33 and an edge of the second protrusion 32n on the second support plate 32. It can be understood that, for a second notch (not shown in the figure) provided on the second support plate 32, and third protrusions that are provided on the first support plate 31 and the third support plate 33 and that correspond to the second notch, a disposing manner for the second subsection 320 and the fourth subsection 340 is similar to a disposing manner shown in FIG. 7(c). Details are not described herein.

In some implementations, minimum distances between points on two edges of the second subsection 320 that are parallel to the second direction $S_2$ and the projection $g_1$ are equal, and similarly, minimum distances between points on two edges of the fourth subsection 340 that are parallel to the second direction $S_2$ and the projection $g_2$ are equal.

Figure 7D:
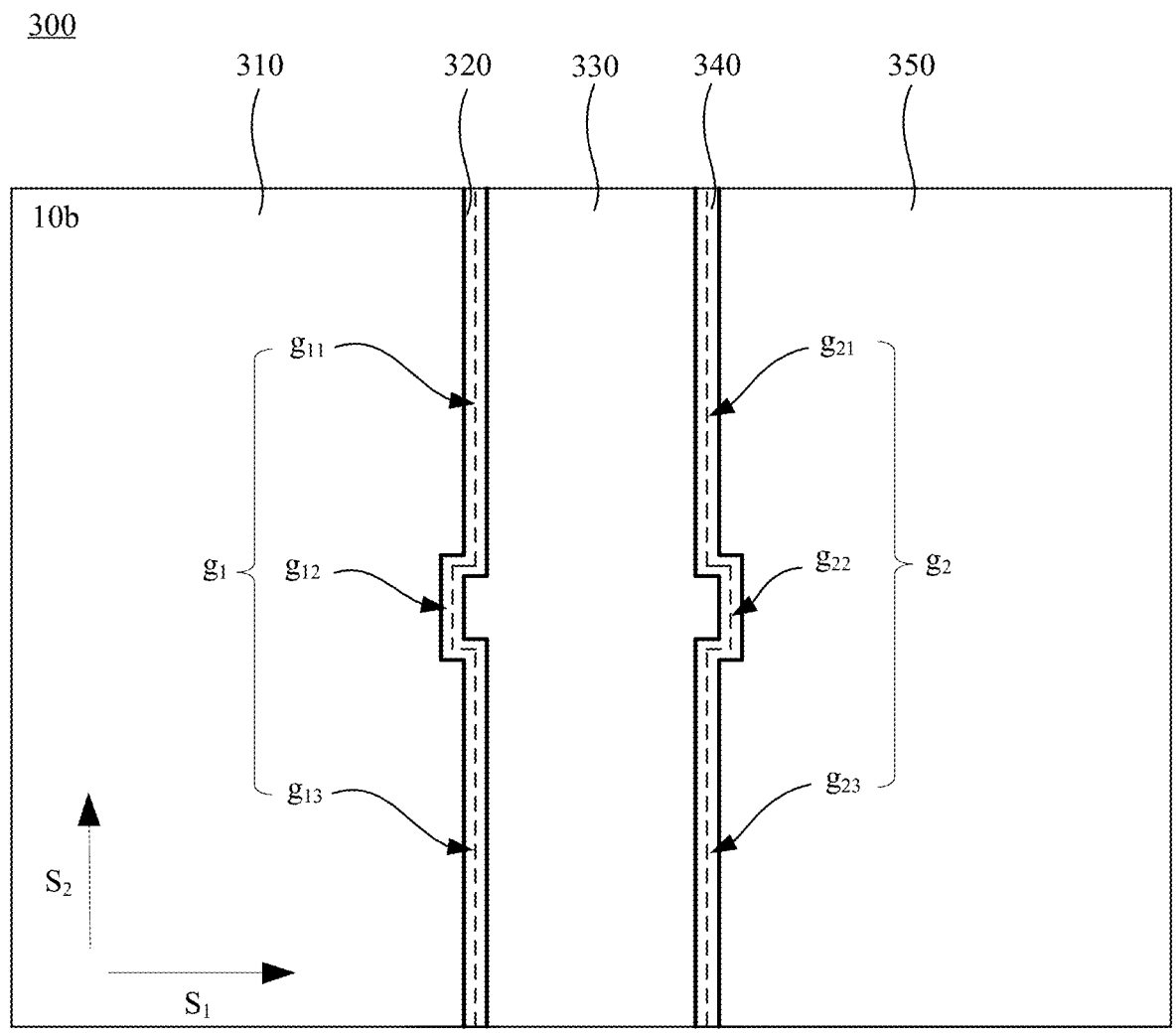
FIG. 7(d) is a schematic diagram of a third section 300 of a screen bearing plate 10 according to some other embodiments of this application.

FIG. 7(d) is a schematic diagram of a third section 300 of a screen bearing plate 10 according to some other embodiments of this application. As shown in FIG. 7(d), the second subsection 320 is an area extending along the projection $g_1$. In other words, an extension path of the second subsection 320 is the same as an extension path of the first gap Gap 1 between the first support plate 31 and the second support plate 32. In other words, the extension path of the second subsection 320 is the same as the extension path of the entire first gap Gap 1 including the edge of the first notch 31m on the first support plate 31 and the edge of the first protrusion 32m on the second support plate 32. The fourth subsection 340 is an area extending along the projection $g_2$. In other words, an extension path of the fourth subsection 340 is the same as an extension path of the second gap Gap 2 between the second support plate 32 and the third support plate 33. In other words, the extension path of the fourth subsection 340 is the same as the extension path of the entire second gap Gap 2 including the edge of the third notch 33n on the third support plate 33 and the edge of the second protrusion 32n on the second support plate 32. It can be understood that, for the second notch (not shown in the figure) provided on the second support plate 32, and the third protrusions that are provided on the first support plate 31 and the third support plate 33 and that correspond to the second notch, the disposing manner for the second subsection 320 and the fourth subsection 340 is similar to a disposing manner shown in FIG. 7(d). Details are not described herein.

In the foregoing layout manner for the second subsection 320 and the fourth subsection 340, the first gap Gap 1 between the first support plate 31 and the second support plate 32 and the second gap Gap 2 between the second support plate 32 and the third support plate 33 are implemented. In addition, a proportion of the first subsection 320 and the fourth subsection 340 on the plate surface of the screen bearing plate 10 is reduced as much as possible, that is, bendability of the screen bearing plate 10 is ensured as much as possible.

In some implementations, distances between the points on the edges of the second subsection 320 that are parallel to the second direction $S_2$ and the projection $g_1$ are equal, and similarly, distances between the points on the edges of the fourth subsection 340 that are parallel to the second direction $S_2$ and the projection $g_2$ are equal.

Figure 7E:
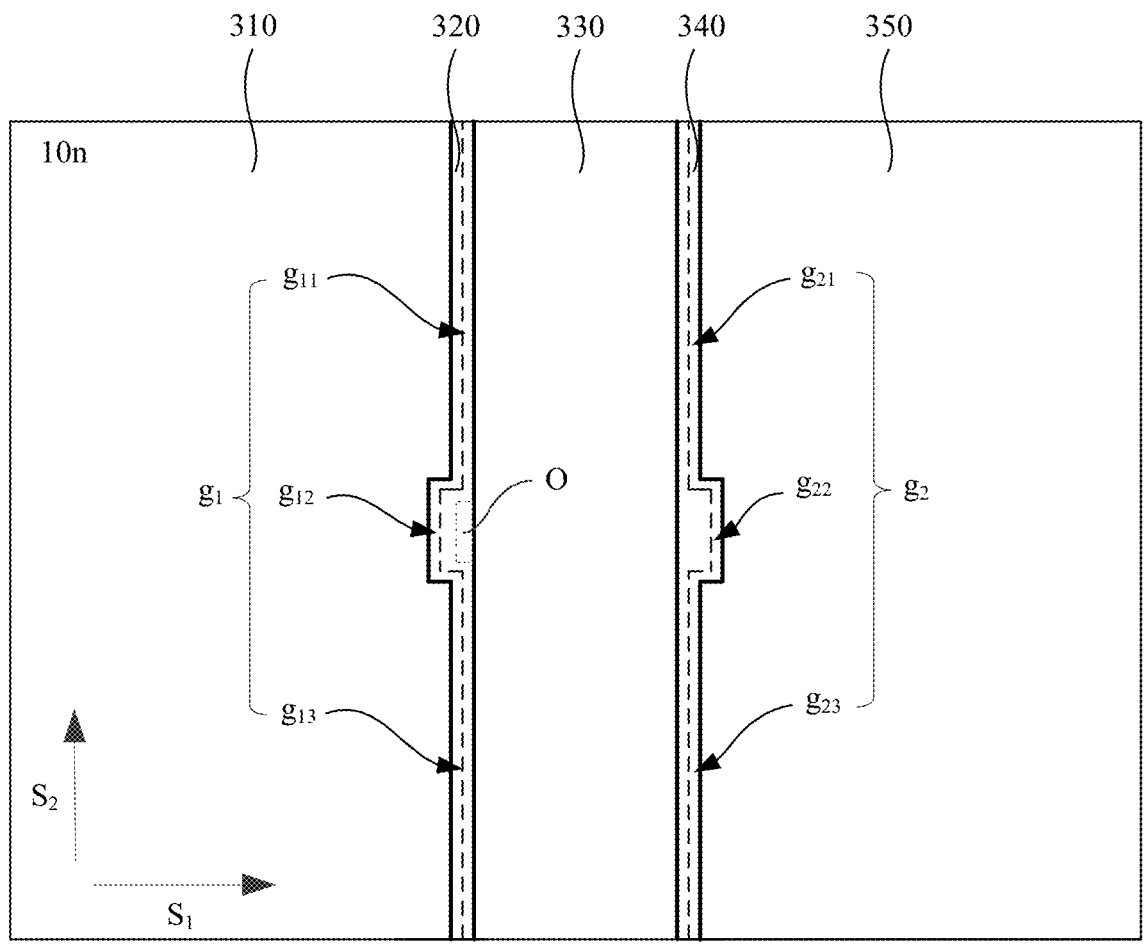
FIG. 7(e) is a schematic diagram of a third section 300 of a screen bearing plate 10 according to still some other embodiments of this application.

FIG. 7(e) is a schematic diagram of a third section 300 of a screen bearing plate 10 according to still some other embodiments of this application. The second subsection 320 includes an extension area extending along the projection $g_1$ and an inward concave area on two sides of the extension area (for example, an area O in FIG. 7(e)). In other words, the second subsection 320 includes the extension area in which the extension path of the second subsection 320 is the same as the extension path of the entire first gap Gap 1 including the edge of the first notch 31m on the first support plate 31 and the edge of the first protrusion 32m on the second support plate 32; and an area in which the first protrusion 32m is located. Similarly, the fourth subsection 340 includes an extension area (as shown in FIG. 7(d)) extending along the projection $g_2$ and inward concave areas on two sides of the extension area. In other words, the fourth subsection 340 includes the extension area in which the extension path of the fourth subsection 340 is the same as the extension path of the entire first gap Gap 2 including the edge of the third notch 33n on the third support plate 33 and the edge of the second protrusion 32n on the second support plate 32; and an area in which the second protrusion 32n is located. It can be understood that, for the second notch (not shown in the figure) provided on the second support plate 32, and the third protrusions that are provided on the first support plate 31 and the third support plate 33 and that correspond to the second notch, the disposing manner for the second subsection 320 and the fourth subsection 340 is similar to a disposing manner shown in FIG. 7(e). Details are not described herein.

The foregoing layout manner for the second subsection 320 and the fourth subsection 340 avoids disseveration of an entire structure due to the small-sized inward concave areas of the second subsection 320 and the fourth subsection 340, and reduces a processing difficulty.

Figure 7F:
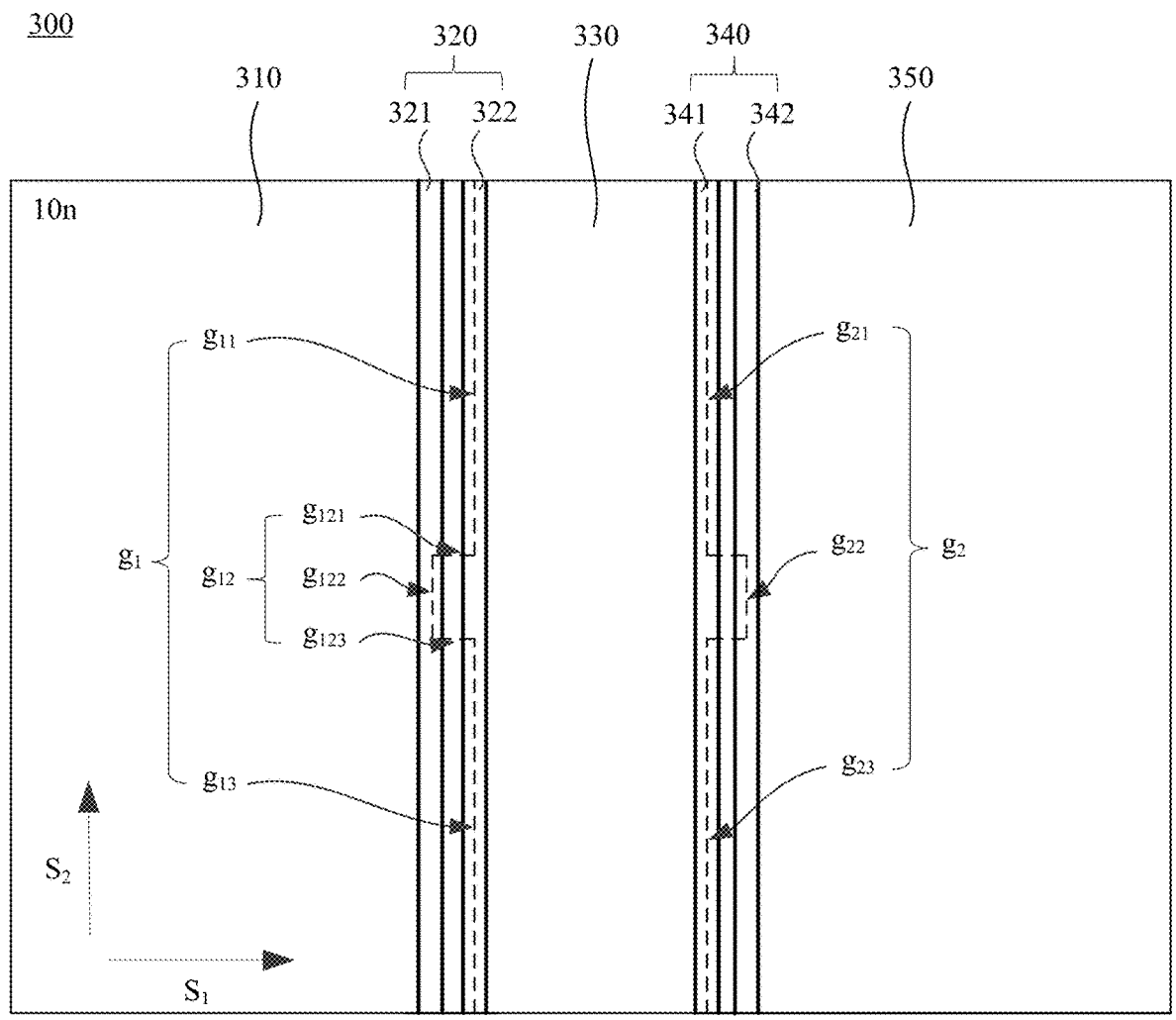
FIG. 7(f) is a schematic diagram of a third section 300 of a screen bearing plate 10 according to yet some other embodiments of this application.

FIG. 7(f) is a schematic diagram of a third section 300 of a screen bearing plate 10 according to yet some other embodiments of this application. A difference between FIG. 7(f) and FIG. 7(d) lies in that, in FIG. 7(e), in the second segment of projection $g_{12}$, a distance between a protruding part of the second segment of projection $g_{12}$ and a straight line is longer. For example, the second segment of projection $g_{12}$ includes a transition line segment $g_{121}$, a main line segment $g_{122}$, and a transition line segment $g_{123}$ that are sequentially connected, and a distance between the main line segment $g_{122}$ and the straight line on which the first segment of projection $g_{11}$ and the third segment of projection $g_{13}$ are located is longer. The second subsection 320 includes a sub-subsection 321 and a sub-subsection 322. The sub-subsection 321 covers a main line segment $g_{122}$ of the second segment of projection $g_{12}$, and the sub-subsection 322 covers the first segment of projection gin and the third segment of projection $g_{13}$. In addition, the sub-subsection 321 further covers an end (not marked out), of the transition line segment $g_{121}$, connected to the main line segment $g_{122}$, and an end (not marked out), of the transition line segment $g_{113}$, connected to the main line segment gin. The sub-subsection 321 further covers an end (not marked out), of the transition line segment $g_{121}$, connected to the first projection $g_{11}$, and an end (not marked out), of the transition line segment gin, connected to the third projection $g_{13}$.

In some implementations, the second subsection 320 may not cover an area between the transition line segment $g_{121}$ and the transition line segment gin. It can be understood that, when an included angle between the transition line segment $g_{121}$ and the transition line segment $g_{13}$ and the bending axis is relatively large (close to 90°), no subsection needs to be disposed at the transition line segment $g_{121}$ and the transition line segment $g_{123}$; or when an included angle between the transition line segment $g_{121}$ and the transition line segment $g_{123}$ and the bending axis is relatively small (close to 0°), several subsections of relatively small dimensions along the second direction $S_2$ may be added at the transition line segment $g_{121}$ and the transition line segment $g_{123}$. Similarly, the fourth subsection 340 includes a sub-subsection 341 and a sub-subsection 342. Details are not described herein again. In other words, in the first gap Gap 1 including the edge of the first notch 31m on the first support plate 31 and the edge of the first protrusion 32m on the second support plate 32, a part that has an extension direction parallel to the second direction $S_2$ includes a gap (corresponding to the main line segment $g_{122}$) between an edge, of the first notch 31m, parallel to the second direction $S_2$ and an edge, of the first protrusion 32m, parallel to the second direction $S_2$; and a gap (corresponding to the first segment of projection $g_{11}$ and the third segment of projection $g_{13}$) between an edge, of the first support plate 31, other than the first notch 31m, and an edge, of the second support plate 32, other than the first protrusion 32m. An orthographic projection, on the plate surface of the screen bearing plate 10, of the gap corresponding to the main line segment $g_{122}$ is within an orthographic projection, of the sub-subsection 321, on the plate surface of the screen bearing plate 10. An orthographic projection, on the plate surface of the screen bearing plate 10, of the gap corresponding to the first segment of projection $g_{11}$ and the third segment of projection $g_{13}$ is within an orthographic projection, of the sub-subsection 322, on the plate surface of the screen bearing plate 10.

To ensure balance of bending performance of the screen bearing plate 10, in some embodiments, the second subsection 320, the fourth subsection 340, the sub-subsection 321, the sub-subsection 322, the sub-subsection 341, and the sub-subsection 342 are all subsections that penetrate the screen bearing plate 10 along the second direction $S_2$.

The second subsection 320 and/or the fourth subsection 340 are/is divided into several subsections that penetrate along the second direction $S_2$, to ensure consistency of a structure of the screen bearing plate 10 at a same location along the first direction $S_1$ and further facilitate dispersion, along the second direction $S_2$, of stress generated in the folded state to two ends of the screen bearing plate 10, thereby avoiding residual stress as much as possible. Therefore, in the foregoing implementation, consistency of bendability performance of the screen bearing plate 10 is ensured, and a local protrusion formed on the screen bearing plate 10 along the second direction $S_2$ in the folded state is avoided, thereby further prolonging service life of the screen bearing plate 10 and the flexible display panel 20.

After the correspondence between the second subsection 320 and the first gap Gap 1 between the first support plate 31 and the second support plate 32, and the correspondence between the fourth subsection 340 and the second gap Gap 2 between the second support plate 32 and the third support plate 33 are described, optimized solutions of the second subsection 320 and the fourth subsection 340 are further described.

Figure 8A:
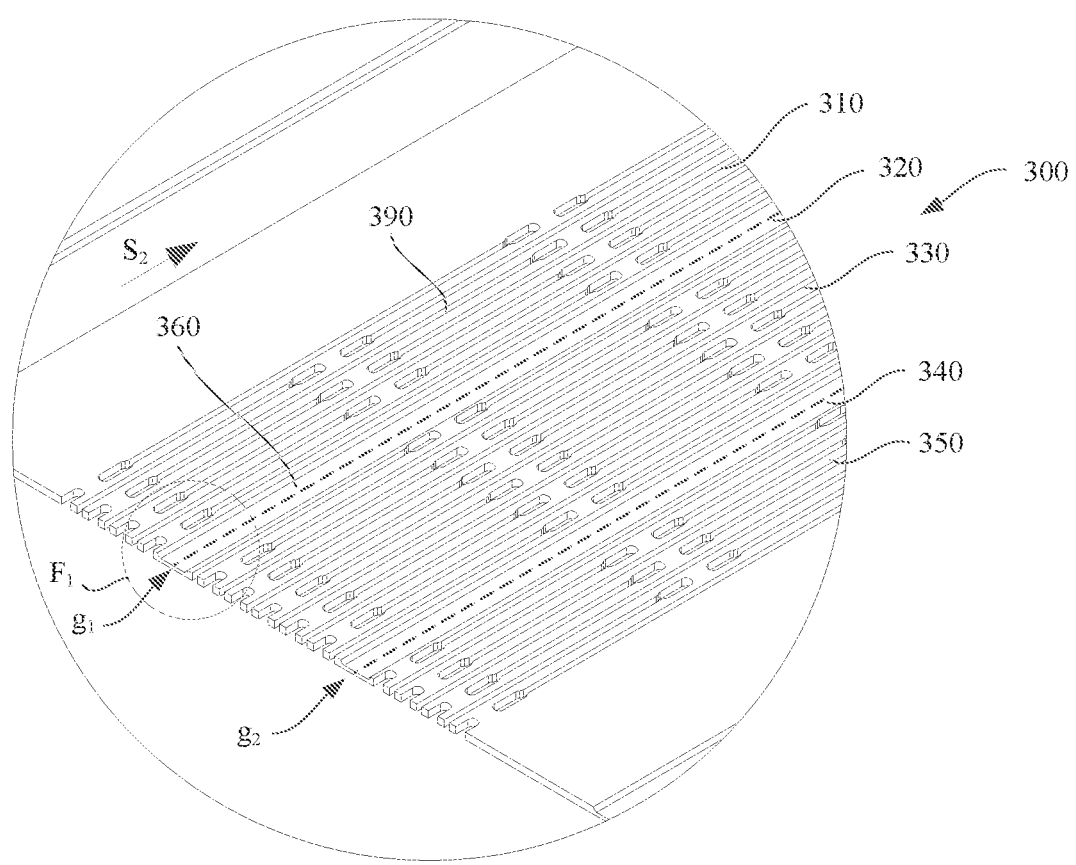
FIG. 8(a) shows a partial enlarged view of an area E of a screen bearing plate 10 according to some other embodiments of this application.
Figure 8B:
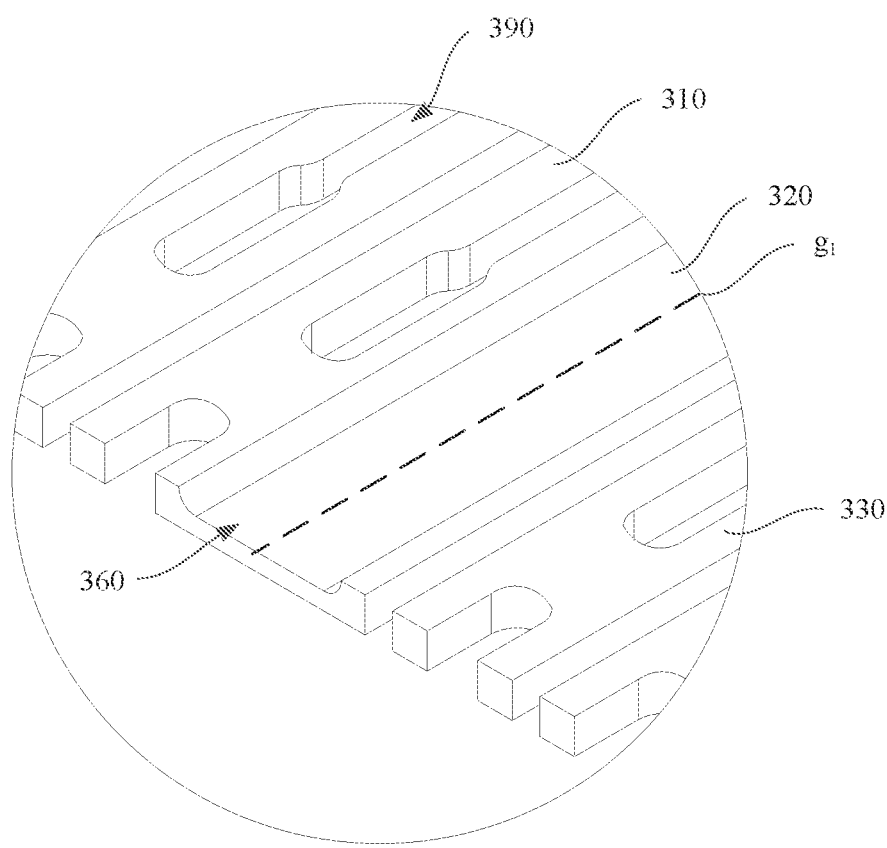
FIG. 8(b) shows a partial enlarged view of an area $F_1$ in FIG. 8(a) according to some embodiments of this application.

FIG. 8(*a*) shows a partial enlarged view of an area E of a screen bearing plate 10 in a flattened state according to some other embodiments of this application. FIG. 8(*b*) shows a partial enlarged view of an area $F_1$ in FIG. 8(*a*). In some embodiments, a groove 360 is disposed on both plate surfaces of the second subsection 320 and the fourth subsection 340, and an extension direction of the groove 360 is parallel to a second direction $S_2$. It can be understood that the groove 360 is provided in at least a part of the second subsection 320 and at least a part of the fourth subsection 340 that are of the same screen bearing plate 10, and no groove 360 is provided on another part. For example, thicknesses of two sides, of the second subsection 320, closer to the first support plate 31 and the second support plate 32 along the first direction $S_1$ remain the same, and the groove 360 is provided in a middle area between the two sides. Alternatively, the groove 360 is provided in all parts of the second subsection 320 and all parts of the fourth subsection 340 that are on the same screen bearing plate 10.

To further improve user experience, in some embodiments, the groove 360 are disposed on the back side 10*n* of the screen bearing plate 10, that is, the groove 360 are disposed on a side, of the screen bearing plate 10, facing away from the flexible display panel 20. In the foregoing structure, an opening of the groove 360 faces the support plate 30, and a bottom of the groove faces the flexible display panel 20, so that a feeling of a void is avoided as much as possible when a user touches the flexible display panel 20, thereby improving user experience.

In some embodiments, a thickness of the screen bearing plate 10 ranges from 0.10 mm to 0.2 mm, and a dimension of the bottom of the groove 360 ranges from 0.03 mm to 0.15 mm. Correspondingly, a depth of the groove 360 ranges from 0.05 mm to 0.17 mm. It can be understood that the thickness of the screen bearing plate 10 is a sum of the dimension of the bottom of the groove 360 and the depth of the groove 360.

Figure 9A:
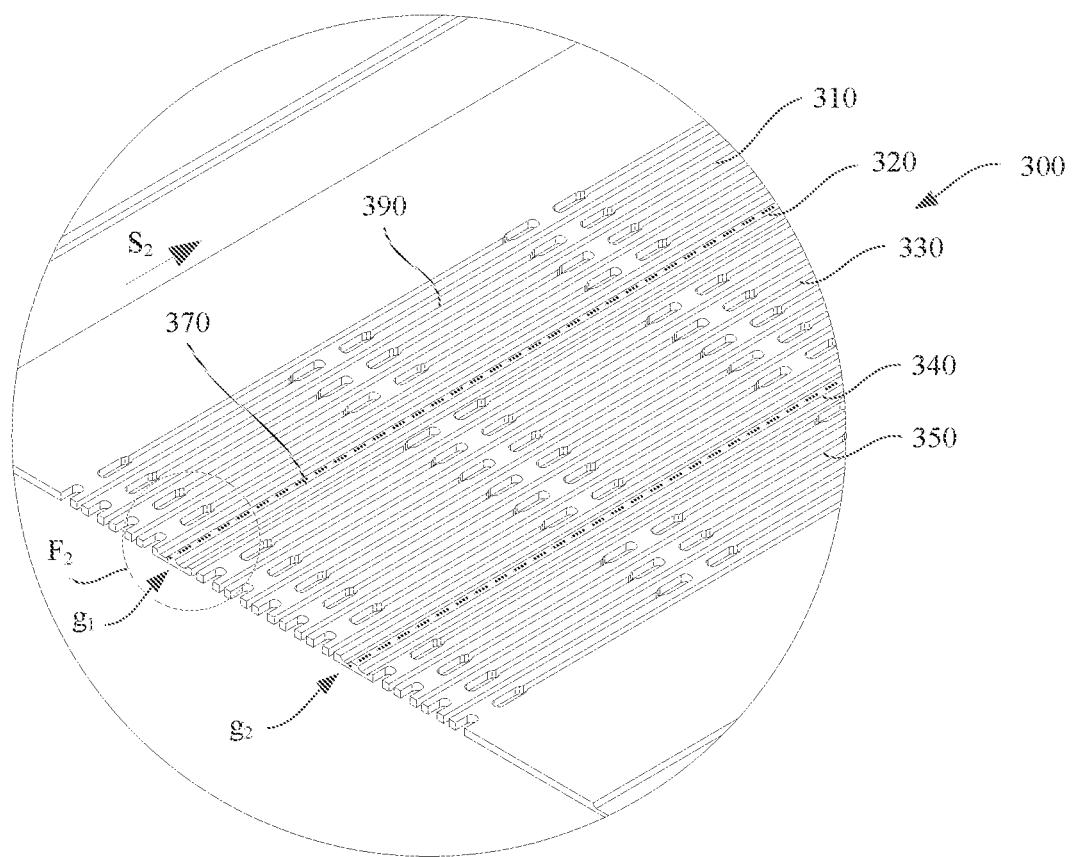
FIG. 9(a) shows a partial enlarged view of an area E of a screen bearing plate 10 according to some other embodiments of this application.
Figure 9B:
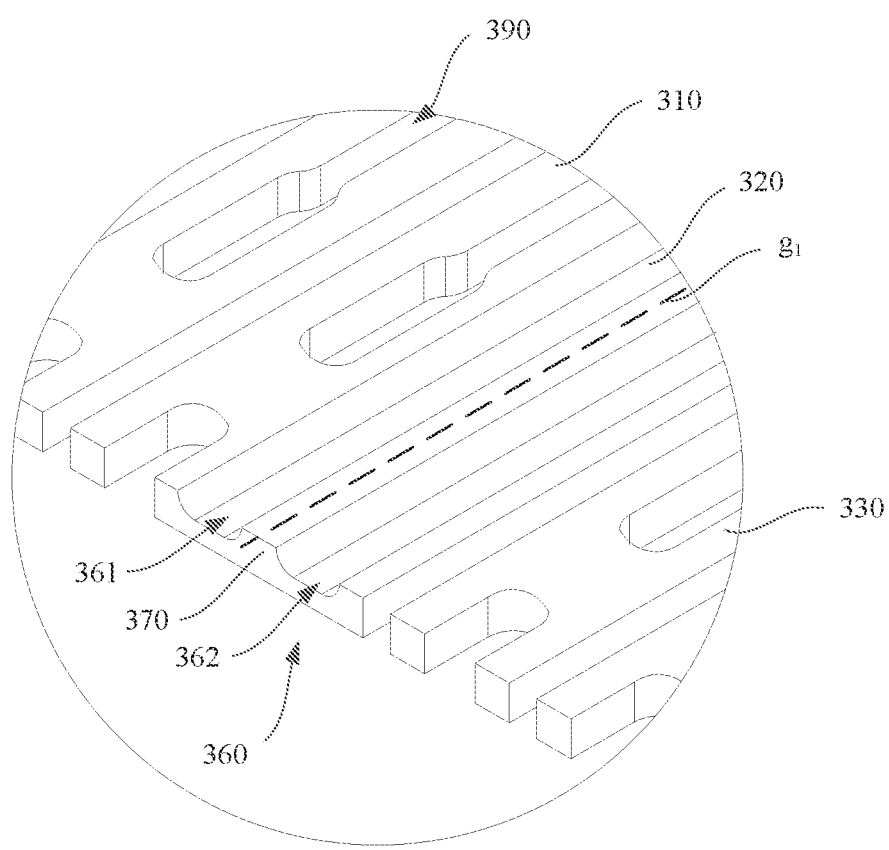
FIG. 9(b) shows a partial enlarged view of an area $F_2$ in FIG. 9(a) according to some embodiments of this application.

FIG. 9(*a*) shows a partial enlarged view of an area E of a screen bearing plate 10 in a flattened state according to some other embodiments of this application. FIG. 9(*b*) shows a partial enlarged view of an area $F_2$ in FIG. 9(*a*). When a first gap Gap 1 between a first support plate 31 and a second support plate 32 and/or a second gap Gap 2 between a second support plate 32 and a third support plate 33 are/is relatively wide, to ensure rigidity and strength of a second subsection 320 and a fourth subsection 340, in some embodiments, a groove 360 includes a first groove 361 and a second groove 362. A reinforcing rib 370 is disposed between the first groove 361 and the second groove 362, and an extension direction of the reinforcing rib 370 is parallel to a second direction $S_2$.

In some embodiments, when a dimension of the groove 360 along a first direction $S_1$ is greater than 1.5 mm, the groove 360 includes the first groove 361 and the second groove 362, and the reinforcing rib 370 is disposed between the first groove 361 and the second groove 362.

In some embodiments, dimensions of the second subsection 320 and the fourth subsection 340 along the first direction $S_1$ range from 0.5 mm to 2 mm.

FIG. 10(*a*) shows a partial enlarged view of an area E of a screen bearing plate 10 in a flattened state according to still some other embodiments of this application. FIG. 10(*b*) shows a partial enlarged view of an area $F_3$ in FIG. 10(*a*). When a gap between two adjacent support plates is relatively wide, to ensure strength of a second subsection 320 and a fourth subsection 340, in some embodiments, a plurality of hole structures 380 spaced from each other are provided in the second subsection 320 and the fourth subsection 340.

To effectively improve supporting performance of the second subsection 320 and the fourth subsection 340 of the screen bearing plate 10, in some embodiments, a maximum one-dimensional dimension, of each of the hole structures 380, on a plate surface of the screen bearing plate 10 is less than a minimum one-dimensional dimension of a minimum contact zone. It can be understood that the hole structures 380 may be through holes or blind holes. The minimum contact zone may be a touch zone that is obtained based on big data and that represents a minimum area for a user to touch or a minimum unidirectional dimension for touch, for example, may be a minimum zone in which the user uses a finger to touch a screen.

To further improve the supporting performance of the second subsection 320 and the fourth subsection 340 of the screen bearing plate 10, in some embodiments, the hole structures 380 are distributed in a staggered manner on two sides of a projection, of a gap, on the plate surface.

In some implementations, as shown in FIG. 10(*c*), a cross-section of each of the hole structures 380 is a circular cross-section 381.

To diversify the hole structure 380 and match with rigidity and bendability satisfying a plurality of requirements, in some other alternative implementations, as shown in FIG. 10(*d*), a cross-section of the hole structure 380 is a polygonal cross-section 382.

To diversify the hole structure 380 and match with rigidity and bendability satisfying a plurality of requirements, in some other alternative implementations, as shown in FIG. 10(*e*), a cross-section of the hole structure 380 is a rounded rectangle cross-section 383.

In some other alternative implementations, as shown in FIG. 10(*f*), a cross-section of the hole structure 380 is a racetrack-shaped cross-section 384. The racetrack-shaped cross-section 384 includes a first semicircle 3841, a rectangle 3842, and a second semicircle 3843 that are sequentially disposed and connected along a same axis. In a direction perpendicular to the same axis, the first semicircle 3841, the rectangle 3842, and the second semicircle 3843 have a same dimension. Edges of the first semicircle 3841, the rectangle 3842, and the second semicircle 3843 are tangent and smoothly transitioned. The hole structure 380 is disposed as racetrack-shaped. A large dimension in a second direction $S_2$ ensures bendability of a third section 300 around an axis parallel to the second direction $S_2$. Moreover, in a first direction $S_1$, the circular structures at two ends can improve bendability of the third section 300 and avoid cracks at the two ends in a process of bending.

In some other alternative implementations, as shown in FIG. 10(*g*), a cross-section of the hole structure 380 is a dumbbell-shaped cross-section 385. The dumbbell-shaped cross-section 385 includes a first racetrack 3851, a rectangle 3852, and a second racetrack 3853 that are sequentially disposed and connected along a same axis. In a direction perpendicular to the same axis, a dimension of the first racetrack 3851 and the second racetrack 3852 is greater than a dimension of the rectangle 3852. Edges of the first racetrack 3851, the rectangle 3852, and the second racetrack 3853 are smoothly transitioned. In the foregoing hole structure 380, a dimension of a middle part is smaller, to increase a dimension of an entity between two adjacent hole structures 380 in the second subsection 320 and the fourth subsection 340 in the flattened state, thereby improving overall rigidity of the third section 300. A larger dimension of the racetrack-like structures at two ends can improve bendability of the third section 300 and avoid cracks at the two ends in a process of bending.

Figure 10A:
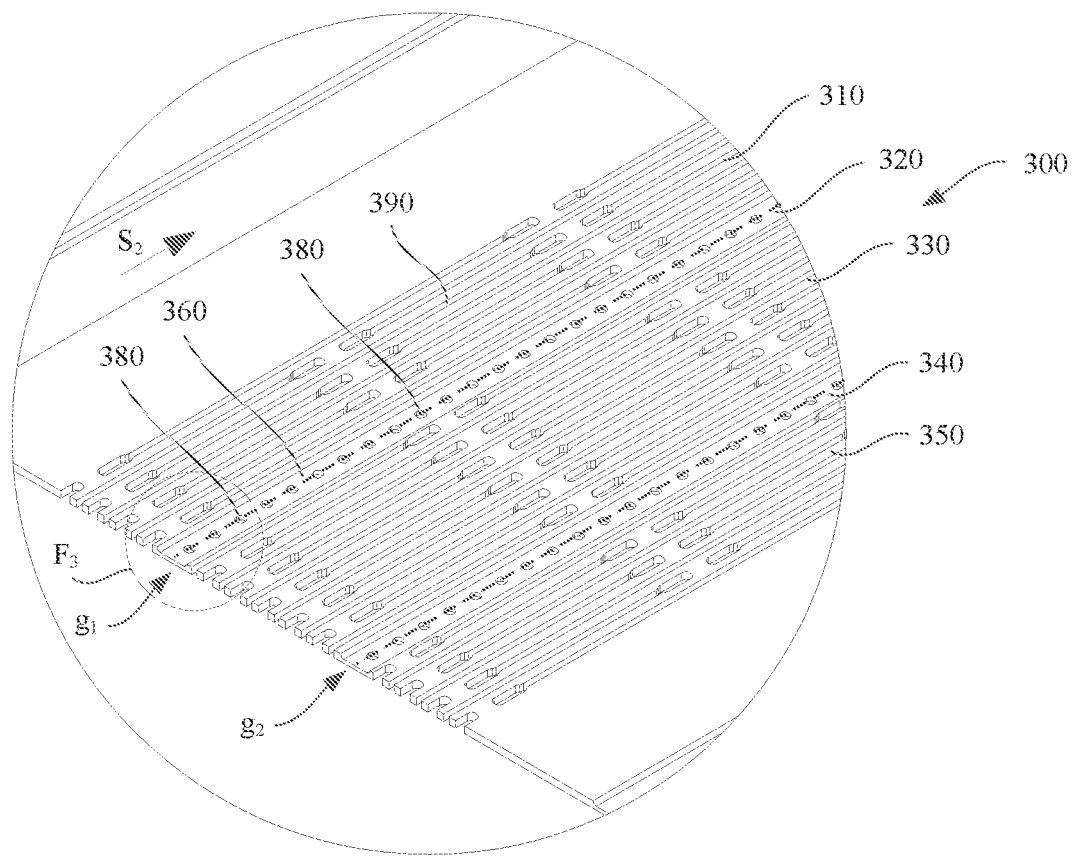
FIG. 10(a) is a partial enlarged view of an area E of a screen bearing plate 10 according to still some other embodiments of this application.
Figure 10B:
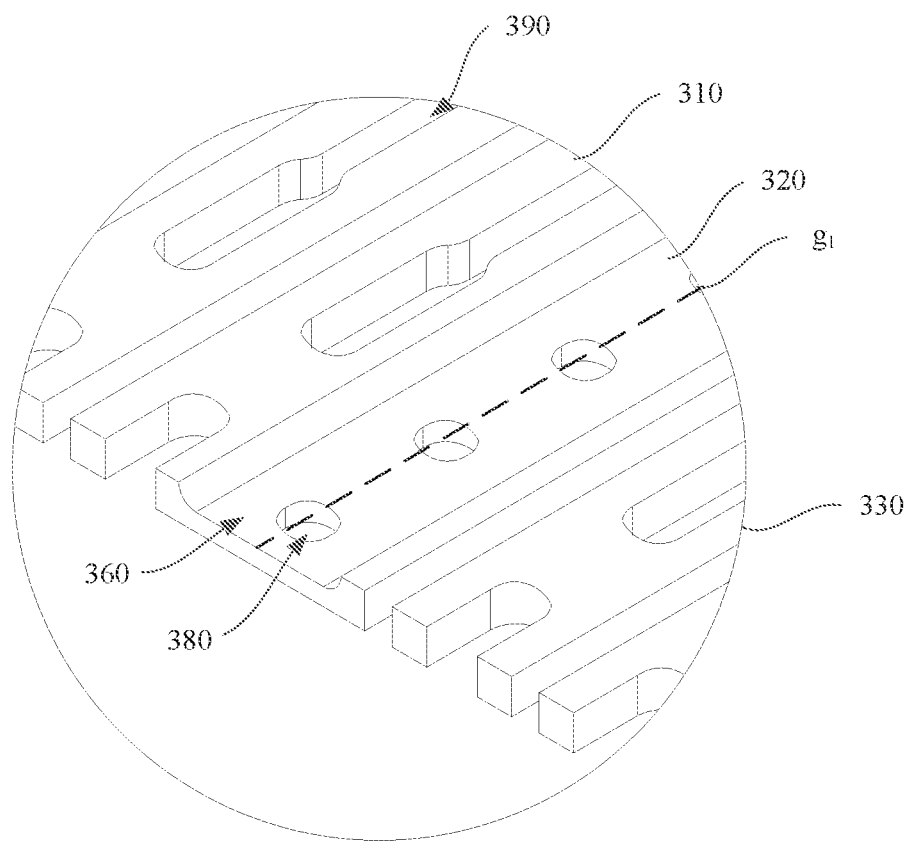
FIG. 10(b) shows a partial enlarged view of an area $F_3$ in FIG. 10(a) according to some embodiments of this application.
Figure 10C:
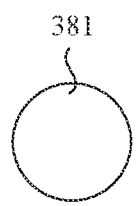
FIG. 10(c) shows a circular cross-section 381 of a hole structure 380 according to some embodiments of this application.
Figure 10D:
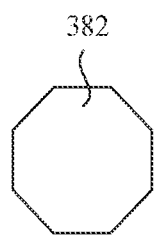
FIG. 10(d) shows a polygonal cross-section 382 of a hole structure 380 according to some embodiments of this application.
Figure 10E:
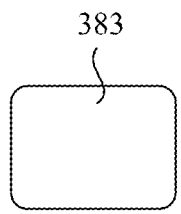
FIG. 10(e) shows a rounded rectangle cross-section 383 of a hole structure 380 according to some embodiments of this application.
Figure 10F:
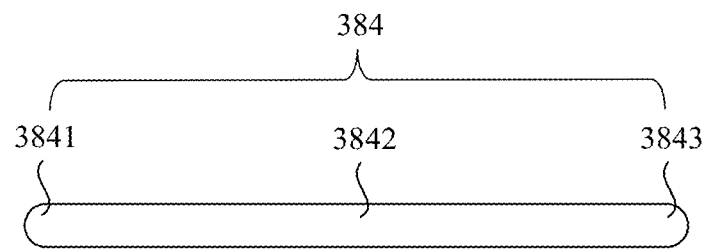
FIG. 10(f) shows a racetrack-shaped cross-section 384 of a hole structure 380 according to some embodiments of this application.
Figure 10G:
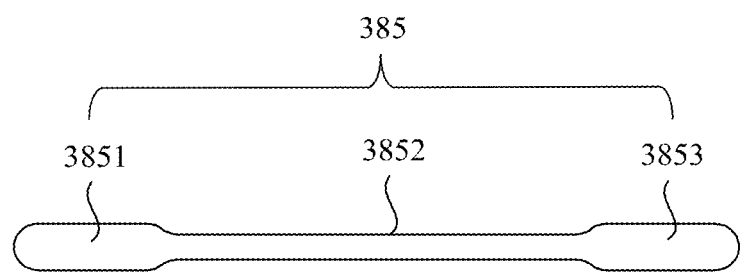
FIG. 10(g) shows a dumbbell-shaped cross-section 385 of a hole structure 380 according to some embodiments of this application.
Figure 10H:
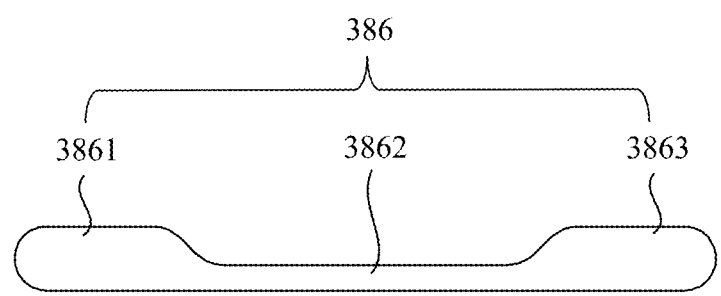
FIG. 10(h) shows a racetrack-dumbbell cross-section 386 of a hole structure 380 according to some embodiments of this application.

In some other alternative implementations, as shown in FIG. 10(h), a cross-section of the hole structure 380 is a racetrack-dumbbell cross-section 386. The racetrack-dumbbell cross-section 386 includes a first racetrack 3861, a rectangle 3862, and a second racetrack 3863 that are sequentially connected. One side of each of the first racetrack 3861, the rectangle 3862, and the second racetrack 3863 are flush with each other, and in a direction perpendicular to the side, a dimension of the first racetrack 3861 and the second racetrack 3863 are greater than a dimension of the rectangle 3862. Edges of the first racetrack 3861, the rectangle 3862, and the second racetrack 3863 are smoothly transitioned.

It can be understood that, shapes of a long-strip-shaped through hole 390 and the hole structure 380 are similar, and a layout manner for each of the long-strip-shaped through holes 390 is the same as that for each of the hole structures 380. For example, each of the long-strip-shaped through holes 390 and each of the hole structures 380 both extend along the second direction $S_2$. A difference between the long-strip-shaped through hole 390 and the hole structure 380 lies in that a dimension of the long-strip-shaped through hole 390 along the second direction $S_2$ is greater than a dimension of the hole structure 380 along the second direction $S_2$.

In some embodiments, the groove 360, the reinforcing rib 370, and hole structures 380 in each of the second subsection 320 and the fourth subsection 340 in this application may be randomly matched based on a requirement on bending and a requirement on support. To be specific, the second subsection 320 and the fourth subsection 340 may each be provided with the groove 360, the second subsection 320 and the fourth subsection 340 may each be provided with the hole structures 380 in the groove 360, the second subsection 320 and the fourth subsection 340 may each be directly provided with the hole structures 380, the second subsection 320 and the fourth subsection 340 may each be provided with the reinforcing rib 370 in the groove 360, or one of the subsections is divided into a plurality of sub-subsections, where at least one of the foregoing forms may be used in the plurality of sub-subsections.

In some implementations, the groove 360, the reinforcing rib 370, and the hole structures 380 in each of the second subsection 320 and the fourth subsection 340 may be matched based on a width of a gap between two adjacent support plates 30. For example, a wider gap between the two adjacent support plates 30 indicates a less deep groove 360, a more densely laid-out reinforcing rib 370 indicates a smaller diameter of each of the hole structures 380 and a smaller coverage proportion of the hole structures 380.

In some other implementations, the groove 360, the reinforcing rib 370, and the hole structures 380 in each of the second subsection 320 and the fourth subsection 340 are matched based on a contour shape of a gap between two adjacent support plates 30.

Figure 11A:
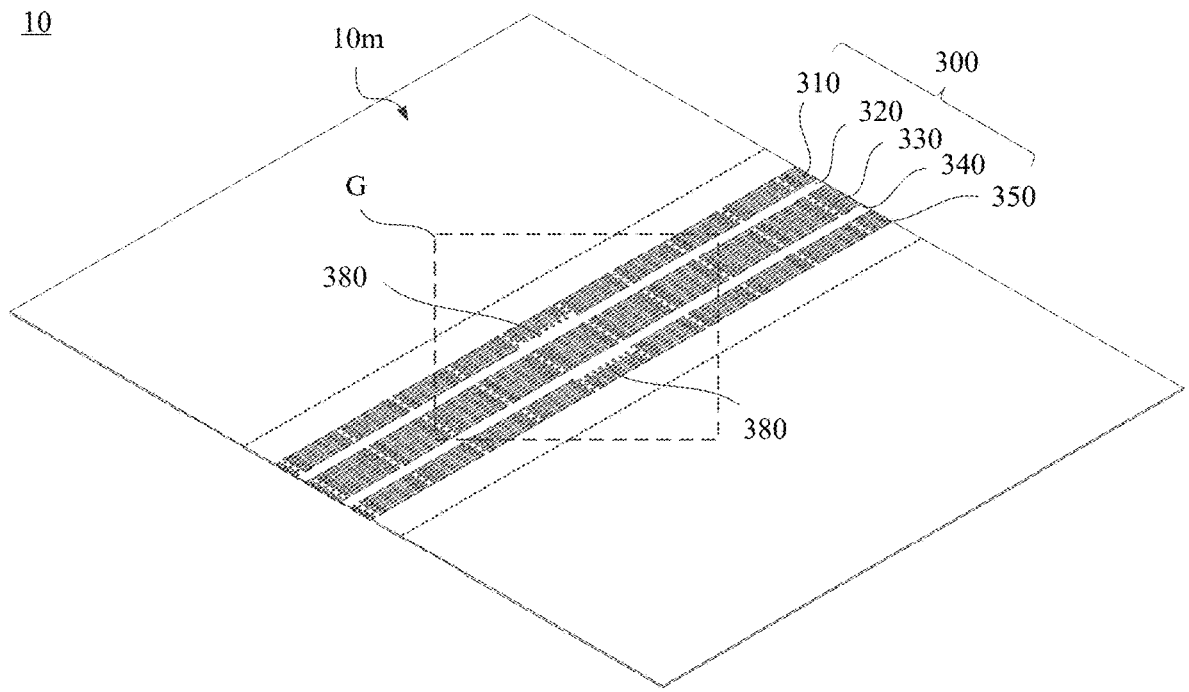
FIG. 11(a) is a schematic three-dimensional diagram of a third section 300 of a screen bearing plate 10 according to some embodiments of this application.
Figure 11B:
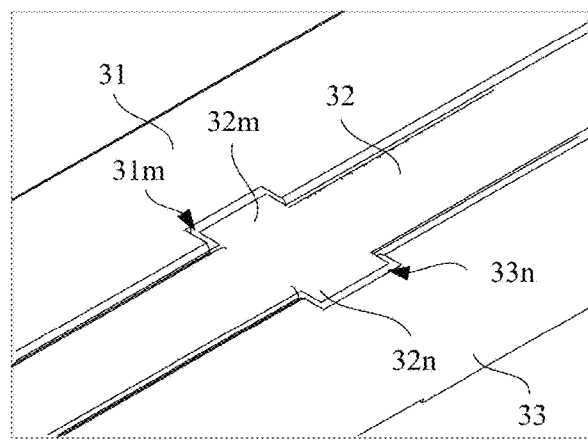
FIG. 11(b) is a schematic three-dimensional diagram of a support plate 30 in an area G in a figure according to some embodiments of this application.
Figure 11C:
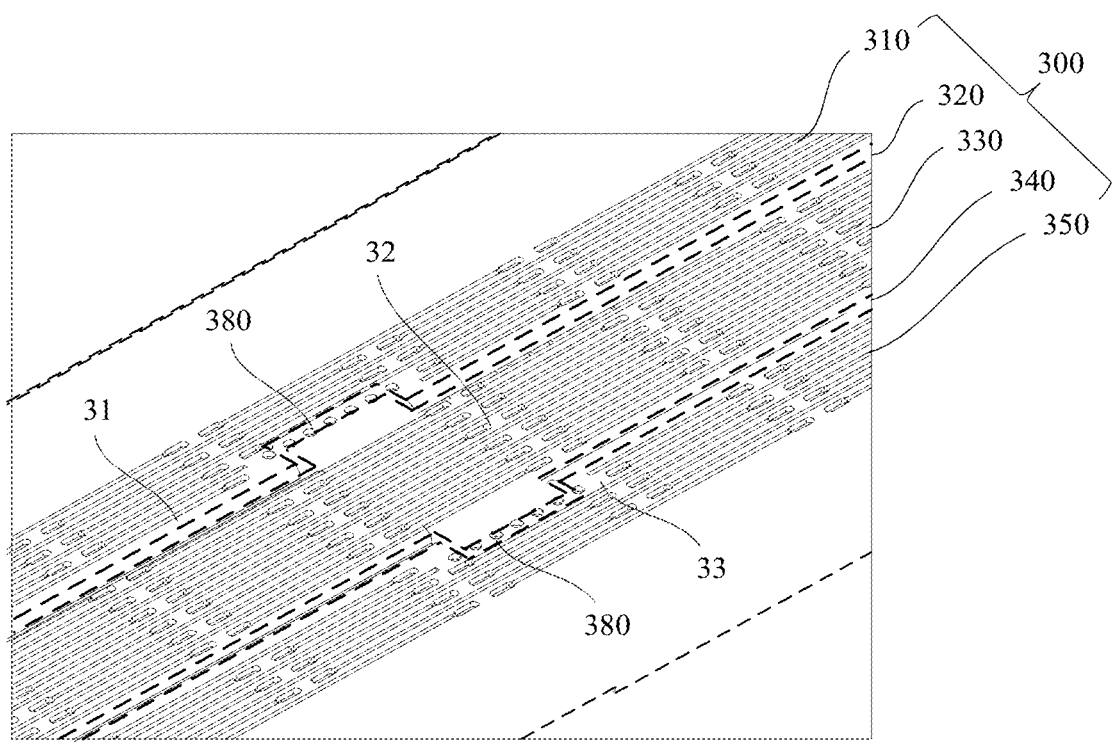
FIG. 11(c) is a schematic three-dimensional diagram of a third section 300 and a support plate 30 in an area G in a figure according to some embodiments of this application.

For example, when the contour shape of the gap between the two adjacent support plates 30 is the same as a contour shape shown in FIG. 7(d), FIG. 11(a) is a three-dimensional diagram of a screen bearing plate 10. FIG. 11(b) is a three-dimensional diagram of a first support plate 31, a second support plate 32, and a third support plate 33 in an area G in FIG. 11(a). FIG. 11(c) is a schematic diagram of cooperation between a third section 300 and the first support plate 31, the second support plate 32, and the third support plate 33 in the area G in FIG. 11(a). In FIG. 11(c), a groove (not shown, refer to FIG. 8(b)) is disposed in a subsection corresponding to a gap with a relatively long extension length, and hole structures 380 are disposed spaced from each other in a subsection (an area in which the second segment of projection $g_1$, in FIG. 7(d), on a left side of an area D is located) corresponding to a gap with a relatively short extension length.

Figure 12:
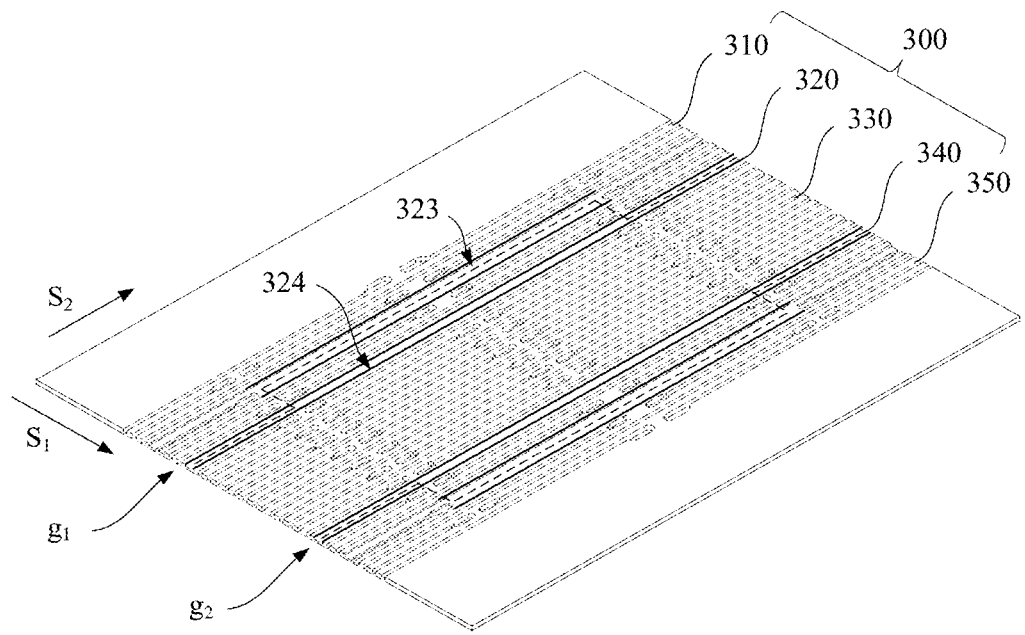
FIG. 12 is a schematic three-dimensional diagram of a third section 300 of and a support plate 30 in a screen bearing plate 10 according to some other embodiments of this application.

For another example, as shown in FIG. 12, the contour shape of the gap between the two adjacent support plates 30 is the same as that shown in FIG. 7(e). In FIG. 12, a second subsection 320 includes a sub-subsection 323 and a sub-subsection 324. A groove (not shown in the figure, refer to FIG. 8(b)) is disposed in both the sub-subsection 323 and the sub-subsection 324.

In some embodiments, a material of the screen bearing plate 10 is at least one of titanium alloy, aluminum alloy, and stainless steel.

In some implementations, a process for processing the screen bearing plate 10 is etching. For example, a second bending groove 210, a groove 360, a reinforcing rib 370, hole structures 380, a long-strip-shaped through hole 390, and a third bending groove 410 that are on the screen bearing plate 10 are etched through an etching process.

With reference to FIG. 3(b) and FIG. 4(b), it can be learned that this application further provides a flexible screen assembly 2. The flexible screen assembly 2 includes any one of the foregoing screen bearing plates 10 and flexible display panels 20. The screen bearing plate 10 is disposed on a back side of the flexible display panel 20 and is connected to the flexible display panel 20.

In an implementation, the flexible display panel 20 bonds with and is fixed to a local area of the screen bearing plate 10 through the adhesive layer. The local area is a part, of the screen bearing plate 10, other than the third section 300. In another implementation, the screen bearing plate 10 bonds with and is fixed to all areas of the flexible display panel 20 through the adhesive layer.

This application further provides an electronic device 1, for example, any one of the foregoing electronic devices 1. Details are not described herein again.

It should be noted that, in this specification, reference signs and letters in the accompanying drawings represent similar items. Therefore, once an item is defined in one of the accompanying drawings, the item does not need to be further defined or described in following accompanying drawings.

Implementations of this application are described above by using specific embodiments. A person skilled in the art may easily learn of other advantages and effects of this application based on content disclosed in this specification. Although this application is described with reference to some embodiments, it does not mean that a characteristic of this application is limited only to this implementation. On the contrary, a purpose of describing this application with reference to an implementation is to cover another option or modification that may be derived based on claims of this application. This application may be alternatively implemented without using these details. In addition, to avoid confusion or blurring a focus of this application, some specific details are omitted from the descriptions. It should be noted that embodiments in this application and features in embodiments may be mutually combined if there is no conflict.

In the descriptions of this application, it should be noted that, locations or location relationships indicated by terms "center", "up", "down". "left". "right", "vertical", "horizontal", "outer side". "inner side", "circumferential direction", "radial direction", "axial direction", and the like are based on locations or location relationships shown in the accompanying drawings, and are merely intended for ease of describing this application and simplifying descriptions, instead of indicating or implying that a mentioned apparatus or element needs to be provided on a specific location or constructed and operated on a specific location, and therefore shall not be understood as limitations on this application.

In the descriptions of this application, it should be further noted that, unless otherwise specified and limited, the terms "dispose", "mount", "connect", and "attach" should be understood in a broad sense, for example, may be a fixed connection, a detachable connection, or an integrated connection; may be a mechanical connection or an electrical connection; or may be a direct connection, or may be an indirect connection by using an intermediate medium, or may be an interconnection between two components. For a person of ordinary skill in the art, specific meanings of the foregoing terms in this application may be understood based on specific cases.

It is clear that a person skilled in the art can make various modifications and variations to this application without departing from the spirit and scope of this application. This application is intended to cover these modifications and variations to this application provided that the modifications and variations fall within the scope of protection defined by the claims of this application and their equivalent technologies.

What is claimed is:

1. An electronic device comprising:
    a screen bearing plate comprising:
        a first section;
        a second section;
        a third section comprising:
            a first subsection;
            a second subsection;
            a third subsection;
            a fourth subsection; and
            a fifth subsection, wherein the first subsection, the second subsection, the third subsection, the fourth subsection, and the fifth subsection are sequentially disposed along a first direction, and wherein a first rigidity of the first subsection, a third rigidity of the third subsection, and a fifth rigidity of the fifth subsection are lower than a second rigidity of the second subsection and a fourth rigidity of the fourth subsection;
        a fourth section; and
        a fifth section, wherein the first section, the second section, the third section, the fourth section, and the fifth section are sequentially disposed along the first direction, and wherein a first section rigidity of the first section and fifth section rigidity of the fifth section are higher than a second section rigidity of the second section, a third section rigidity of the third section, and a fourth section rigidity of the fourth section;
    a flexible display panel; and
    a support plate, wherein the screen bearing plate is disposed between the flexible display panel and the support plate, and wherein the support plate comprises:
        a first support plate;
        a second support plate; and
        a third support plate, wherein when the electronic device is in a flattened state, the first support plate, the second support plate, and the third support plate are sequentially disposed in the first direction;
    wherein when the electronic device is in a folded state:
        the first section and the fifth section are disposed opposite each other;
        the second section, the third section, and the fourth section are in a bent state;
        the first support plate, the second support plate, and the third support plate are disposed around the electronic device to form an accommodating space; and
        at least a part of the screen bearing plate and at least a part of the flexible display panel are disposed in the accommodating space; and
    wherein when the electronic device is in a flattened state:
        the first support plate, the second support plate, and the third support plate are sequentially disposed in the first direction;
        each of first orthographic projections on a plate surface of the screen bearing plate of the first support plate, the second support plate, and a first gap between the first support plate and the second support plate is at least partially within a first area comprising the second subsection; and
        each of second orthographic projections on the plate surface of the second support plate, the third support plate, and a second gap between the second support plate and the third support plate is at least partially within a second area comprising the fourth subsection.

2. The electronic device according to claim 1, wherein the first rigidity, the third rigidity, and the fifth rigidity are lower than the second rigidity and the fourth rigidity.

3. The electronic device according to claim 1, wherein when the electronic device is in the flattened state, a third orthographic projection of the first gap on the plate surface is within the first area, and wherein a fourth orthographic projection of the second gap on the plate surface is within the second area.

4. The electronic device according to claim 1, wherein when the electronic device is in the flattened state, the second subsection and the fourth subsection are rectangular areas that penetrate the screen bearing plate along a second direction perpendicular to the first direction.

5. The electronic device according to claim 1, wherein the first subsection, the second subsection, the third subsection, the fourth subsection, and the fifth subsection comprise a same material, and wherein a second thickness of the second subsection and a fourth thickness of the fourth subsection are less than a first thickness of the first subsection, a third thickness of the third subsection, and a fifth thickness of the fifth subsection.

6. The electronic device according to claim 5, further comprising a groove disposed on both the second subsection and the fourth subsection, wherein the groove extends along a second direction, and wherein when the electronic device is in the flattened state, the second direction is parallel to the plate surface and is perpendicular to the first direction.

7. The electronic device according to claim 6, wherein the groove comprising an opening that faces away from a surface of the flexible display panel, and wherein the surface is an illumination surface.

8. The electronic device according to claim 7, wherein the first subsection, the third subsection, and the fifth subsection comprise long-strip-shaped through-holes that extend along the second direction and are staggered and adjacent to each other along the first direction, wherein a first surface of the second subsection comprises a first bending groove and faces away from the illumination surface, and wherein a second surface of the fourth section comprises a second bending groove and faces away from the illumination surface.

9. The electronic device according to claim 6, wherein the groove comprises a first groove and a second groove, and wherein the electronic device further comprises a reinforcing rib disposed between the first groove and the second groove and extending along the second direction.

10. The electronic device according to claim 6, wherein a dimension of the groove in each of the second subsection and the fourth subsection in a thickness direction of the electronic device ranges from 0.03 millimeters (mm) to 0.15 mm.

11. The electronic device according to claim 1, wherein dimensions of the second subsection and the fourth subsection in the first direction range from 0.5 millimeters (mm) to 2 mm.

12. The electronic device according to claim 1, wherein a material of the screen bearing plate is at least one of titanium alloy, aluminum alloy, or stainless steel.

13. The electronic device according to claim 1, wherein the first subsection, the second subsection, the third subsection, the fourth subsection, and the fifth subsection are made of the same material, and wherein a plurality of hole structures are provided in the second subsection and the fourth subsection.

14. The electronic device according to claim 13, wherein a cross-sectional shape, of each of the hole structures, parallel to the plate surface of the screen bearing plate is any one of a circle, a rectangle, a racetrack, or a dumbbell.

* * * * *